(12) United States Patent
Lee et al.

(10) Patent No.: US 9,835,899 B2
(45) Date of Patent: Dec. 5, 2017

(54) DISPLAY DEVICE CONTAINING MULTIPLE OPTICAL CONVERSION LAYERS

(71) Applicant: Samsung Display Co., Ltd., Yongin, Gyeonggi-Do (KR)

(72) Inventors: Dae-Young Lee, Seoul (KR); Donggun Park, Seoul (KR); Hyang-Shik Kong, Seongnam-si (KR); Jung Gun Nam, Seoul (KR); Gugrae Jo, Asan-si (KR)

(73) Assignee: Samsung Display Co., Ltd., Yongin (KR)

( * ) Notice: Subject to any disclaimer, the term of this patent is extended or adjusted under 35 U.S.C. 154(b) by 0 days.

(21) Appl. No.: 14/527,544

(22) Filed: Oct. 29, 2014

(65) Prior Publication Data
US 2015/0198845 A1 Jul. 16, 2015

(30) Foreign Application Priority Data

Jan. 13, 2014 (KR) ........................ 10-2014-0004085

(51) Int. Cl.
*G02F 1/1335* (2006.01)
*G02F 1/1368* (2006.01)

(52) U.S. Cl.
CPC ...... *G02F 1/133528* (2013.01); *G02F 1/1368* (2013.01); *G02F 1/133553* (2013.01); *G02F 1/133602* (2013.01); *G02F 2001/133548* (2013.01); *G02F 2001/133565* (2013.01)

(58) Field of Classification Search
CPC ........ G02F 2201/133548; G02F 2201/133565; G02F 1/133528; G02F 1/133553; G02F 1/133602; G02F 1/1368
See application file for complete search history.

(56) References Cited

U.S. PATENT DOCUMENTS

| | | | |
|---|---|---|---|
| 6,243,199 B1 | 6/2001 | Hansen et al. | |
| 7,158,302 B2 | 1/2007 | Chiu et al. | |
| 7,466,484 B2 | 12/2008 | Mi et al. | |
| 7,573,546 B2 | 8/2009 | Lee et al. | |
| 7,800,823 B2 | 9/2010 | Perkins | |
| 2007/0019292 A1* | 1/2007 | Kim et al. | 359/486 |
| 2007/0076143 A1 | 4/2007 | Palk et al. | |
| 2008/0002106 A1 | 1/2008 | Van de Witte et al. | |
| 2008/0100781 A1 | 5/2008 | Choo et al. | |
| 2008/0252825 A1 | 10/2008 | Kim et al. | |
| 2009/0015902 A1* | 1/2009 | Powers et al. | 359/288 |
| 2009/0109377 A1* | 4/2009 | Sawaki et al. | 349/96 |

(Continued)

FOREIGN PATENT DOCUMENTS

EP 2487532 A1 8/2012

*Primary Examiner* — Charles Garber
*Assistant Examiner* — Brigitte Paterson
(74) *Attorney, Agent, or Firm* — Knobbe Martens Olson & Bear LLP

(57) ABSTRACT

A display device includes a first base substrate, a second base substrate, pixels, a first polarizer, and a second polarizer. The first base substrate includes light transmitting areas and a light blocking area surrounding each of the light transmitting areas. The pixels respectively overlap the light transmitting areas. The first and second polarizers are spaced apart from each other such that the pixels are disposed therebetween. At least one of the first and second polarizers includes a plurality of optical conversion layers, each of which comprises a plurality of lattice wires.

20 Claims, 21 Drawing Sheets

(56) References Cited

U.S. PATENT DOCUMENTS

2011/0079782 A1* 4/2011 Kim .................. G02F 1/133516
                                                257/59
2011/0222002 A1  9/2011 Lee
2012/0206580 A1  8/2012 Chung et al.
2013/0033662 A1  2/2013 Chung et al.

* cited by examiner

DISPLAY DEVICE CONTAINING MULTIPLE OPTICAL CONVERSION LAYERS

CROSS-REFERENCE TO RELATED APPLICATION

This U.S. non-provisional patent application claims priority under 35 U.S.C. §119 of Korean Patent Application No. 10-2014-0004085, filed on Jan. 13, 2014, the contents of which are hereby incorporated by reference in its entirety.

BACKGROUND

Field of Disclosure

The present disclosure generally relates to a display device. More particularly, the present disclosure relates to a display device including an optical conversion layer.

Description of the Related Art

In general, a non-light emission display device, such as a liquid crystal display device, displays an image using an external light. For example, a liquid crystal display device includes a liquid crystal display panel and a backlight unit. The liquid crystal display panel displays the image using the light provided by the backlight unit.

The liquid crystal display panel includes two display substrates and a liquid crystal layer interposed between the two display substrates. Two polarizing films are respectively disposed on the two display substrates. The two polarizing films polarize the light emitted from the backlight unit. The light generated by the backlight unit may or may not be transmitted through the liquid crystal display panel depending on the arrangement of liquid crystal molecules in the liquid crystal layer.

SUMMARY

The present disclosure provides a display device having improved display quality and light efficiency.

An aspect of the present disclosure according to an example embodiment provides a display device including a first base substrate, a second base substrate, pixels, a first polarizer, and a second polarizer. The first base substrate includes light transmitting areas and a light blocking area surrounding each of the light transmitting areas. The pixels respectively overlap the light transmitting areas. The first and second polarizers are spaced apart from each other such that the pixels are disposed therebetween. At least one of the first and second polarizers includes a plurality of optical conversion layers, each of which comprises a plurality of wires arranged in parallel with each other.

The plurality of optical conversion layers may include a first optical conversion layer including a first set of wires arranged in parallel with each other, and a second optical conversion layer including a second set of wires arranged in parallel with each other, wherein the second set of wires arranged in parallel with each other are substantially parallel to the first set of wires arranged in parallel with each other.

The first optical conversion layer and the second optical conversion layer may be disposed over the first base substrate.

The first optical conversion layer and the second optical conversion layer may be disposed such that the first base substrate is disposed between the first and second optical conversion layers.

The first optical conversion layer and the second optical conversion layer may be disposed on the same side of the first base substrate.

The first optical conversion layer and the second optical conversion layer may be disposed between a surface of the first base substrate and the pixels.

At least one of the first and second optical conversion layers may include a polarization part that includes corresponding wires arranged in parallel with each other among the first and second wires arranged in parallel with each other and overlap with the light transmitting areas when viewed in the direction perpendicular to the major surface of the first base substrate, and a reflection part that covers the light blocking area.

The first optical conversion layer may include the polarization part including the first set of wires arranged in parallel with each other and the reflection part, and the second optical conversion layer comprises the polarization part including the second set of wires arranged in parallel with each other.

The corresponding wires arranged in parallel with each other and the reflection part may be made of the same material.

Each of the pixels may include a thin film transistor connected to a corresponding gate line of gate lines disposed over the first base substrate and a corresponding data line of data lines disposed over the first base substrate, and a pixel electrode connected to the thin film transistor.

The polarization part may overlap the pixel electrode and the reflection part may overlap the thin film transistor when viewed in the direction perpendicular to the major surface of the first base substrate.

Each of the first and second sets of wires arranged in parallel with each other may have a thickness of about 50 nm to about 150 nm.

When a sum of a distance between two adjacent wires arranged in parallel with each other in the first set of wires arranged in parallel with each other in a direction in which the first set of wires arranged in parallel with each other are arranged and a width of one lattice wire of the two adjacent wires arranged in parallel with each other in the direction is defined as a pitch, the ratio of the width of the one lattice wire to the pitch in the direction may be in a range from about 0.3:1 to about 0.6:1.

The second set of wires arranged in parallel with each other may have the same pitch as the first set of wires arranged in parallel with each other and the second set of wires arranged in parallel with each other may have the same width as the first set of wires arranged in parallel with each other.

Each of the first and second sets of wires arranged in parallel with each other may include a metal layer and a metal oxide layer covering the metal layer.

The plurality of polarizers may further include a third optical conversion layer including a third set of wires arranged in parallel with each other extending in the same direction as the first set of wires arranged in parallel with each other and being arranged in the same direction as the first set of wires arranged in parallel with each other.

The second polarizer may be a stretch-type polarization film.

The second polarizer may include a third optical conversion layer that includes a third set of wires arranged in parallel with each other, and a fourth optical conversion layer that includes a fourth set of wires arranged in parallel with each other extending in the same direction as the third set of wires arranged in parallel with each other and being arranged in the same direction as the third set of wires arranged in parallel with each other, and the third and fourth optical conversion layers being disposed over the second base substrate.

The display device may further include a black matrix overlapping the light blocking area when viewed in the direction perpendicular to the major surface of the first base substrate, and a plurality of color filters overlapping the light transmitting areas when viewed in the direction perpendicular to the major surface of the first base substrate.

In another aspect, a display device includes a first base substrate, a second base substrate, a plurality of pixels, a first polarizer, and a second polarizer. The first base substrate and the second base substrate are disposed to be spaced apart from each other. The first base substrate includes a plurality of transmitting areas and a light blocking area disposed adjacent to the transmitting areas.

The pixels are disposed between the first base substrate and the second substrate and respectively overlapped with the transmitting areas. The first and second polarizers are spaced apart from each other such that the pixels are disposed therebetween.

At least one of the first and second polarizers includes a plurality of optical conversion layers disposed on different layers from each other, and each of the optical conversion layers includes a plurality of lattice patterns.

The first polarizer includes a first optical conversion layer and a second optical conversion layer. The first optical conversion layer includes a plurality of first lattice patterns and the second optical conversion layer that includes a plurality of second lattice patterns extending in a same direction as the first lattice patterns and being arranged in a same direction as the first lattice patterns. The first and second optical conversion layers are disposed on different layers from each other.

The first optical conversion layer and the second optical conversion layer are disposed on the first base substrate. The first optical conversion layer and the second optical conversion layer are disposed such that the first base substrate is disposed between the first and second optical conversion layers. The first optical conversion layer and the second optical conversion layer are disposed between the first base substrate and the pixels.

At least one of the first and second optical conversion layers includes a polarization part and a reflection part. The polarization part includes corresponding lattice patterns among the first and second lattice patterns and is overlapped with the transmitting areas. The reflection part covers the light blocking area.

The polarization part and the reflection part include the same material.

Each of the pixels includes a thin film transistor and a pixel electrode. The thin film transistor is connected to a corresponding gate line of gate lines disposed on the first base substrate and a corresponding data line of data lines disposed on the first base substrate. The pixel electrode is connected to the thin film transistor.

The polarization part is overlapped with the pixel electrode and the reflection part is overlapped with the thin film transistor.

The second polarizer is a stretch-type polarization film.

Each of the first lattice patterns includes an aluminum layer and an oxide aluminum layer covering the aluminum layer.

The first lattice patterns extend in the same direction as the second lattice patterns.

Each of the first lattice patterns and each of the second lattice patterns have a thickness of about 50 nm to about 150 nm.

When a sum of a distance between two adjacent lattice patterns of the first lattice patterns in the direction in which the first lattice patterns are arranged and a width of one lattice pattern of the two adjacent lattice patterns in the direction is defined as a pitch, the width of the one lattice pattern to the pitch in the direction is in a range from about 0.3:1 to about 0.6:1.

The second lattice patterns have a same pitch as the first lattice patterns and the second lattice patterns have a same width as the first lattice patterns.

According to the above, the optical conversion layers disposed to be overlapped with each other improve the polarization of the light passing through the polarizers. Although one of the first and second optical conversion layers is damaged, the other of the first and second optical conversion layers may polarize the light incident to the polarizers.

The reflection part included in at least one of the first and second optical conversion layers reflects the light provided from the backlight unit without absorbing the light. The reflected light is re-reflected by optical members included in the backlight unit, and then is incident to the liquid crystal display panel. Thus, the amount of the light, which is extinct, is decreased and the amount of the light incident to the liquid crystal display panel is increased, thereby improving the light efficiency.

BRIEF DESCRIPTION OF THE DRAWINGS

The above and other advantages of the present disclosure will become readily apparent by reference to the following detailed description when considered in conjunction with the accompanying drawings wherein.

DETAILED DESCRIPTION

Figure 1:
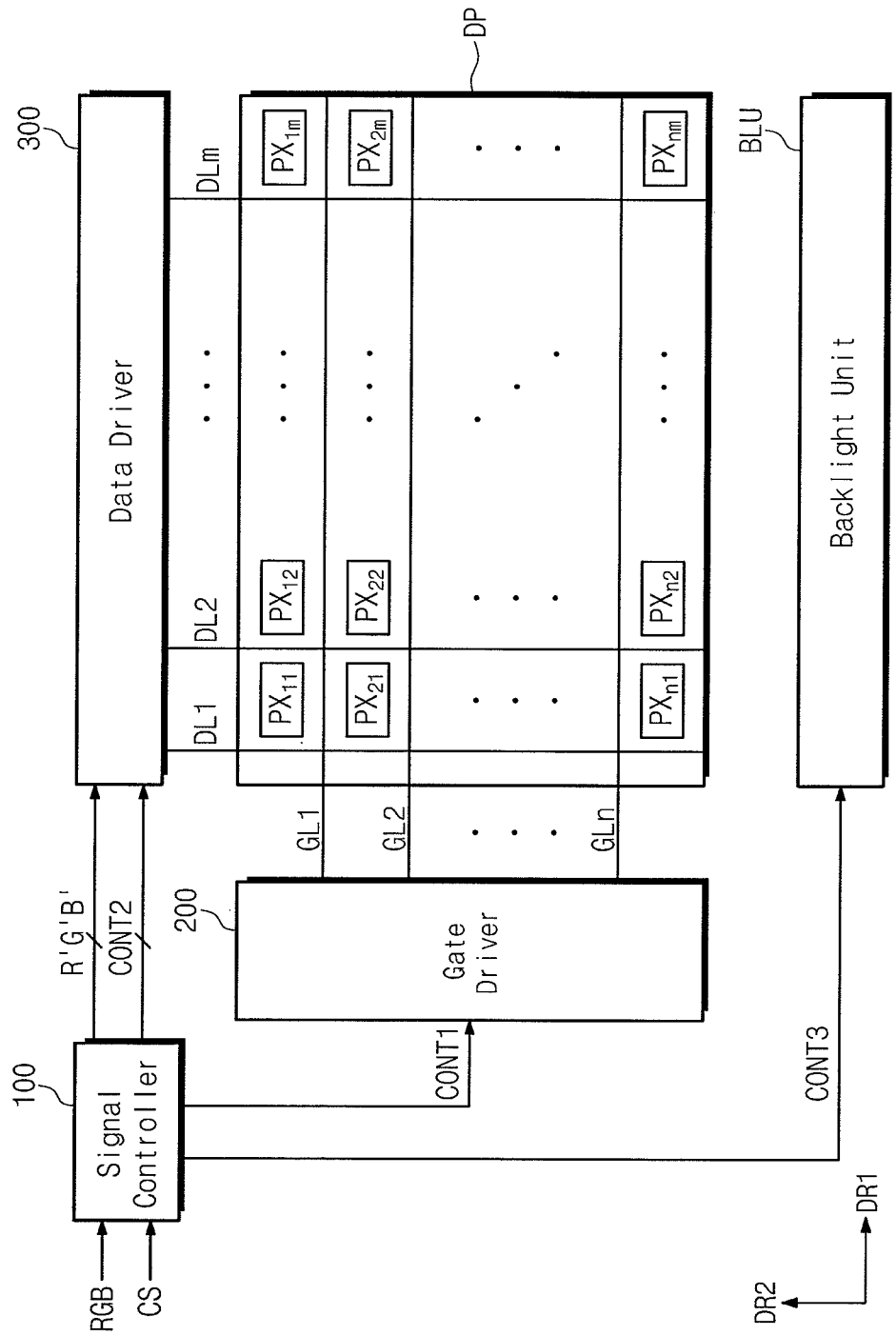
FIG. 1 is a block diagram showing a display device according to an example embodiment of the present disclosure.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present disclosure.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein are to be interpreted accordingly.

The terminology used herein is for the purpose of describing particular embodiments only and is not intended to limit the present invention. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, example embodiments of the present disclosure will be explained in detail with reference to the accompanying drawings.

Figure 2:
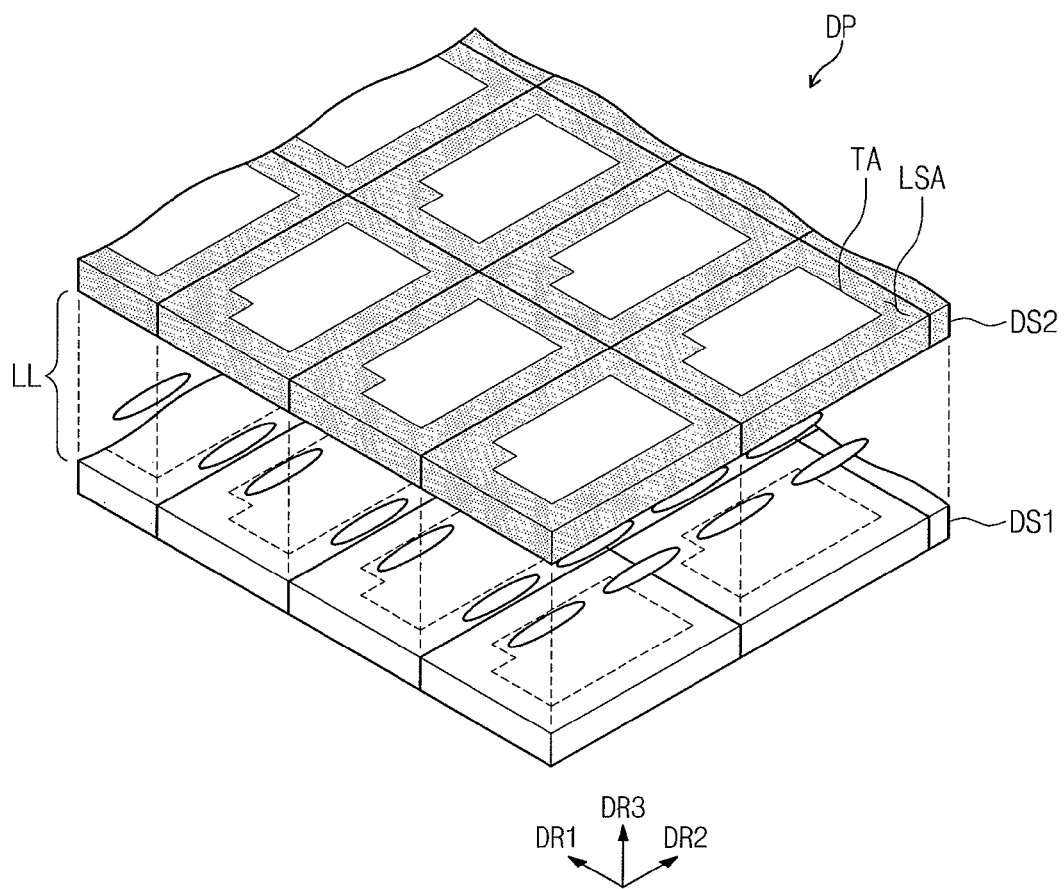
FIG. 2 is a perspective view showing a portion of a display panel shown in FIG. 1.

FIG. 1 is a block diagram showing a display device according to an example embodiment of the present disclosure, and FIG. 2 is a perspective view showing a portion of a display panel shown in FIG. 1. The present example embodiment will be described using a liquid crystal display device as the display device, but the display device should not be limited to the liquid crystal display device, and the techniques of the present example embodiment may be applied or extended to any other display device that includes a polarizer.

Turning to FIG. 1, the liquid crystal display device includes a liquid crystal display panel DP, a signal controller 100, a gate driver 200, a data driver 300, a backlight unit BLU, and two polarizers (not shown).

The liquid crystal display panel DP includes a plurality of signal lines and a plurality of pixels PX11 to PXnm connected to the signal lines. The signal lines include a plurality of gate lines GL1 to GLn and a plurality of data lines DL1 to DLm. The gate lines GL1 to GLn extend in a first direction DR1 (e.g., horizontal direction in FIG. 1) and are arranged in a second direction DR2 (e.g., vertical direction in FIG. 1). The data lines DL1 to DLm are insulated from the gate lines GL1 to GLn while crossing the gate lines GL1 to GLn. For example, the data lines DL1 to DLm are not electrically connected to the gate lines GL1 to GLn. Although not shown in figures, the signal lines may further include a plurality of common lines corresponding to the gate lines GL1 to GLn.

As shown in FIG. 1, pixels PX11 to PXnm are arranged in a matrix form. Each of the pixels PX11 to PXnm is connected to a corresponding gate line of the gate lines GL1 to GLn and a corresponding data line of the data lines DL1 to DLm.

The liquid crystal display panel DP may be, but is not limited to, one of a vertical alignment (VA) mode liquid crystal display panel, a patterned vertical alignment (PVA) mode liquid crystal display panel, an in-plane switching (IPS) mode liquid crystal display panel, a fringe-field switching (FFS) mode liquid crystal display panel, and a plane to line switching (PLS) mode liquid crystal display panel.

The signal controller 100 receives input image signals RGB and converts the input image signals RGB to image data R'G'B' suitable for operating the liquid crystal display panel DP. In addition, the signal controller 100 receives various control signals CS, such as a vertical synchronization signal, a horizontal synchronization signal, a main clock signal, a data enable signal, etc., and outputs first and second control signals CONT1 and CONT2. For example, the first control signal CONT1 is transmitted to the gate driver 200, and the second control signal CONT2 is transmitted to the data driver 300. Further, the signal controller 100 outputs a third control signal CONT3 to control the backlight unit BLU. The third control signal CONT3 may include a dimming signal.

The gate driver 200 applies gate signals to the gate lines GL1 to GLn in response to the first control signal CONT1. The first control signal CONT1 includes a vertical start signal to start an operation of the gate driver 200, a gate clock signal to determine an output timing of a gate voltage, and an output enable signal to determine an on-pulse width of the gate voltage.

The data driver 300 receives the control signal CONT2 and the image data R'G'B'. The data driver 300 converts the image data R'G'B' to data voltages and applies the data voltages to the data lines DL1 to DLm.

The second control signal CONT2 includes a horizontal start signal to start an operation of the data driver 300, an inverting signal to invert a polarity of the data voltages, and an output indicating signal to determine an output timing of the data voltages from the data driver 300.

The backlight unit BLU provides the light to the liquid crystal display panel DP in response to the third control signal CONT3. The backlight unit BLU includes a light emitting device to emit the light. The backlight unit BLU may be edge-illumination type or direct-illumination type. An edge-illumination type backlight unit includes a light guide member, and a direct-illumination type backlight unit does not include a light guide member. Each of the edge-illumination type backlight unit BLU and the direct-illumination type backlight unit BLU may include an optical film. For example, the backlight unit BLU may be edge-illumination type and further include an optical film. In another example, the backlight unit BLU may be direct-illumination type and further include an optical film.

Turning to FIG. 2, a liquid crystal display panel DP including a first display substrate DS1 and a second display substrate DS2 is shown. The first and second display substrates DS1 and DS2 are spaced apart from each other in a thickness direction DR3 (hereinafter, referred to as a third direction) of the liquid crystal display panel DP. For example, the first and second display substrates DS1 and DS2 are a predetermined distance away from each other. The first and second display substrates DS1 and DS2 are coupled to each other by a sealant (not shown) provided on an edge of first or second display substrate DS1 or DS2. For example, in one embodiment, the sealant is provided on an edge of the first display substrate DS1. In another embodiment, the sealant is provided on an edge of the second display substrate DS2. In the example of FIG. 2, a liquid crystal layer LL is disposed between the first and second display substrates DS1 and DS2.

The liquid crystal display panel DP includes a plurality of transmitting areas TA and a light blocking area LSA disposed adjacent to the transmitting areas TA. For example, in each pixel, the light blocking area LSA may surround the transmitting area TA. The transmitting areas TA transmit the light generated by the backlight unit BLU and the light blocking area LSA blocks the light generated by the backlight unit BLU.

The gate lines GL1 to GLn and the data lines DL1 to DLm shown in FIG. 1 are disposed on the first display substrate DS1 and the second display substrate DS2. The gate lines GL1 to GLn and the data lines DL1 to DLm are disposed such that they overlap with the light blocking area LSA. The pixels PX11 to PXnm are disposed to respectively correspond to the transmitting areas TA. For example, each transmitting area TA corresponds to one of the pixels PX11 to PXnm Each of the pixels PX11 to PXnm may partially overlap with a corresponding transmitting area of the transmitting areas TA.

Figure 3:
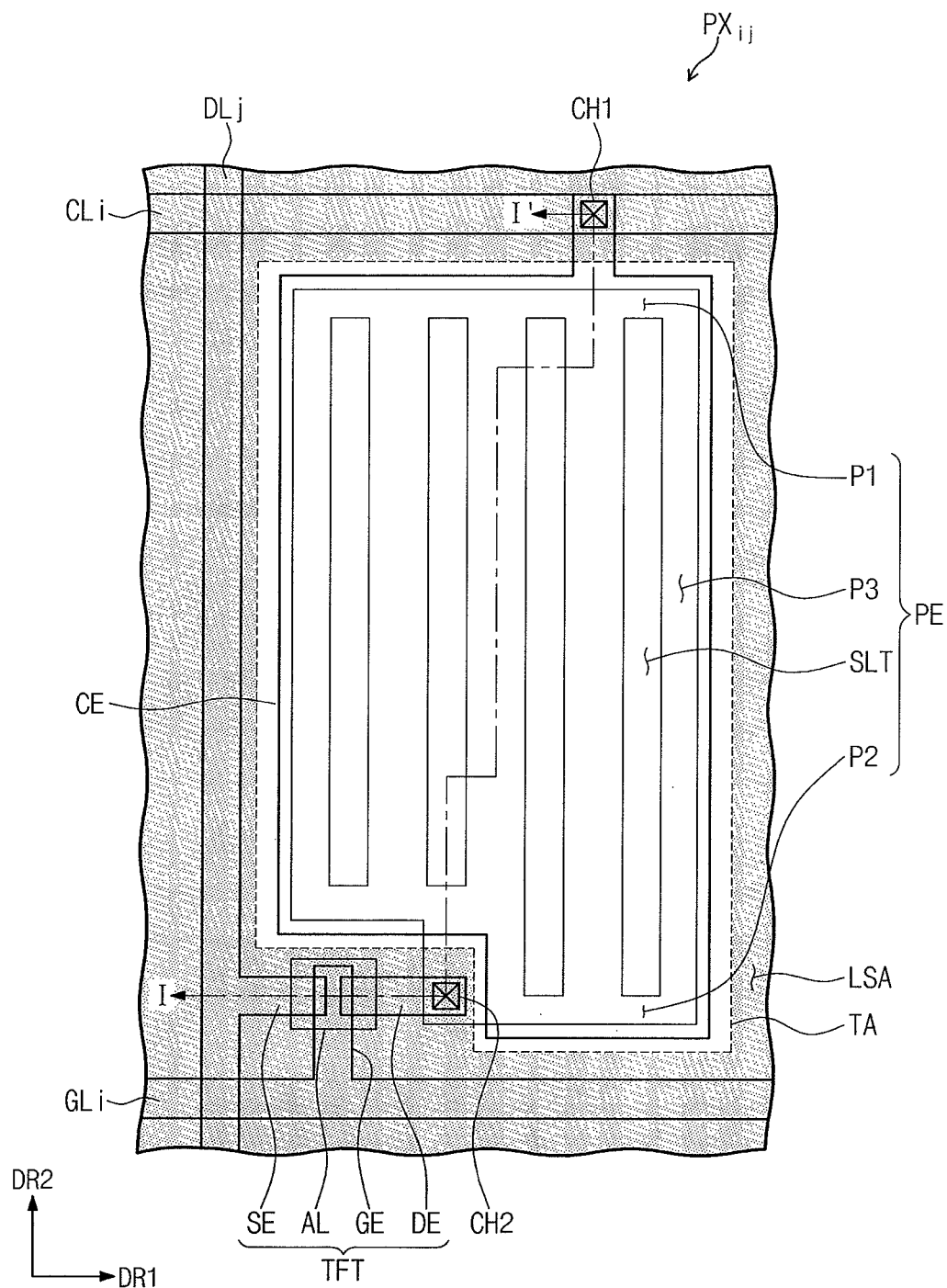
FIG. 3 is a plan view showing a pixel according to an example embodiment of the present disclosure.
Figure 4:
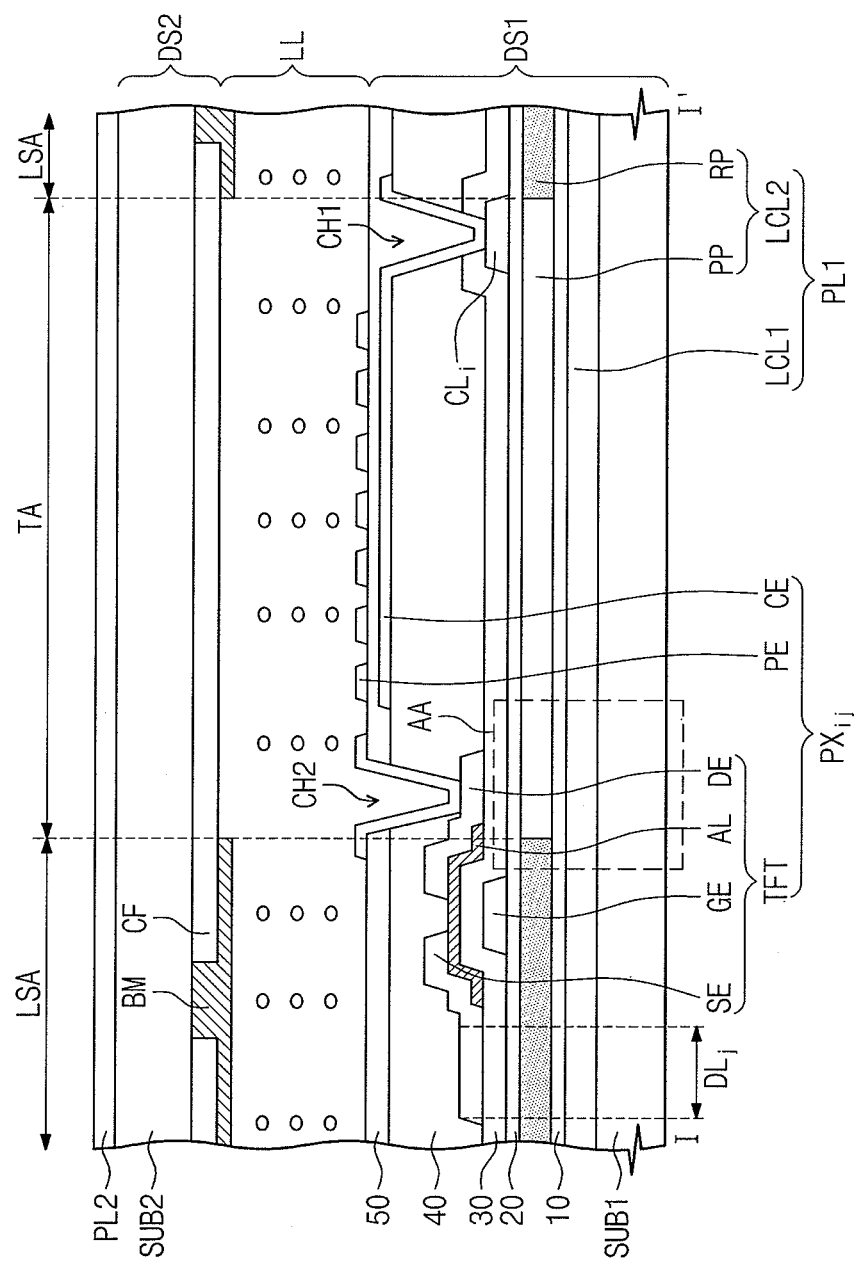
FIG. 4 is a cross-sectional view of a display panel according to an example embodiment of the present disclosure.

FIG. 3 is a plan view showing the pixel according to an example embodiment of the present disclosure, and FIG. 4 is a cross-sectional view of the display panel according to an example embodiment of the present disclosure. FIG. 3 shows the pixel PXij operated in a PLS mode, but the configuration of the pixel PXij should not be limited thereto or thereby, and the embodiments or techniques discussed herein may be applied or extended to pixels having other configurations. FIG. 4 shows a cross-sectional view taken along a line I-I' shown in FIG. 3.

Turning to FIGS. 3 and 4, the first display substrate DS1 includes a first base substrate SUB1, a gate line GLi, a data line DLj, a common line CLi, and a plurality of insulating layers 10, 20, 30, 40, and 50. The second display substrate DS2 includes a second base substrate SUB2, a black matrix BM, and a color filter CF.

As shown in FIG. 4, the second display substrate DS2 is disposed above the first display substrate DS1, but it should not be limited thereto or thereby. For example, in another embodiment, the first display substrate DS1 may be disposed above the second display substrate DS2.

The pixel PXij is disposed between the first base substrate SUB1 and the second base substrate SUB2. As shown in FIGS. 3 and 4, the pixel PXij is disposed on the first base substrate DS1. The pixel PXij includes a thin film transistor TFT, a common electrode CE, and a pixel electrode PE.

A first polarizer PL1 and a second polarizer PL2 are disposed to be spaced apart from each other such that the pixel PXij is disposed therebetween. At least one of the first and second polarizers PL1 and PL2 includes a plurality of optical conversion layers disposed on different layers from each other. For example, each of the plurality of optical conversion layers may be disposed sequentially in the thickness direction, and one or more insulating layers may be interposed between the plurality of optical conversion layers. Each optical conversion layer polarizes the light incident thereto.

In the example of FIG. 4, the first polarizer PL1 includes a first optical conversion layer LCL1 and a second optical conversion layer LCL2. The second optical conversion layer LCL2 is disposed on the first optical conversion layer LCL1. For example, the distance between the first optical conversion layer LCL1 and the liquid crystal layer LL is greater than the distance between the second optical conversion layer LCL2 and the liquid crystal layer LL. Each of the first and second optical conversion layers LCL1 and LCL2 includes a plurality of lattice patterns (not shown) to polarize the light incident thereto. Although the term "lattice pattern" is used herein to describe a single strip shown in FIGS. 7A and 7B, the embodiments of the present disclosure are not limited thereto or thereby, and the term may also encompass a lattice wire, or any other term suitable for describing similar elements of a polarizing film.

Either the first optical conversion layer LCL1 or the second optical conversion layer LCL2 includes a reflection part and a polarization part. The reflection part reflects the incident light. The polarization part polarizes the incident light and substantially corresponds to the lattice patterns. In the example of FIG. 4, the second optical conversion layer LCL2 includes a reflection part RP and a polarization part PP.

In the present example embodiment, the first polarizer PL1 may further include a third optical conversion layer. In addition, the first optical conversion layer may include a reflection part RP and a polarization part PP.

The second polarizer PL2 of the liquid crystal display panel DP according to the present example embodiment may be, but is not limited to, a stretch-type polarization film. The stretch-type polarization film includes a polyvinylalcohol-based polarizer. An iodine-based compound or a dichroic polarizing material is adsorbed into the polyvinylalcohol-based polarizer, and the polyvinylalcohol-based polarizer is stretched in one direction. The stretch-type polarization film may further include a triacetyl cellulose protective film that protects the polarizer.

Each of the first and second polarizers PL1 and PL2 has an optical axis, e.g., a transmission axis. The optical axis of the first polarizer PL1 is substantially perpendicular to or substantially parallel to the optical axis of the second polarizer PL2. In one example embodiment, the second polarizer PL2 may include a plurality of optical conversion layers.

Hereinafter, the first polarizer PL1 and the pixel PXij will be described in detail. According to the present example embodiment, the first polarizer PL1 and the pixel PXij are disposed on one surface of the first base substrate SUB1. For example, in the example of FIG. 4, both the first polarizer PL1 and the pixel PXij are disposed on an upper surface (e.g., facing the liquid crystal layer LL) of the first base substrate SUB1.

The first base substrate SUB1 may be a transparent substrate. For example, the first base substrate SUB1 may be a glass substrate, a plastic substrate, a silicon substrate, etc. In the example of FIG. 4, the first optical conversion layer LCL1 is disposed on the surface of the first base substrate SUB1, and the first insulating layer 10 is disposed on the first optical conversion layer LCL1. A buffer layer may be disposed between the surface of the first base substrate SUB1 and the first optical conversion layer LCL1.

The first insulating layer 10 has a refractive index smaller than or equal to about 1.5. In addition, the first insulating layer 10 has a thickness smaller than or equal to about 300 nm. This is to minimize the polarization of the light exiting from the first optical conversion layer LCL1 until the light reaches the second optical conversion layer LCL2.

In one embodiment, the first insulating layer 10 includes an organic material. In another embodiment, the first insulating layer 10 includes an inorganic material. The first insulating layer 10 may have a multi-layer structure. The first insulating layer 10 may include a silicon inorganic material. The silicon inorganic material may be at least one of silicon oxide and silicon nitride.

In the example of FIG. 4, the second optical conversion layer LCL2 is disposed on the first insulating layer 10. The reflection part RP of the second optical conversion layer LCL2 overlaps the light blocking area LSA, and the polarization part PP of the second optical conversion layer LCL2 overlaps the transmitting area TA. The reflection part RP covers the light blocking area LSA. For example, in one embodiment, the reflection part RP has substantially the same shape as the light blocking area LSA.

A second insulating layer 20 is disposed on the second optical conversion layer LCL2. The second insulating layer 20 may have the same layer structure and/or the same material as those of the first insulating layer 10. The gate line GLi and the common line CLi are disposed on the second insulating layer 20.

A gate electrode GE of the thin film transistor TFT is branched from the gate line GLi. For example, the gate electrode GE is electrically connected to the gate line GLi. The gate electrode GE includes the same material as the gate line GLi and has the same layer structure as the gate line GLi. The gate electrode GE and the gate line GLi may include copper (Cu), aluminum (Al), or alloys thereof. The gate electrode GE and the gate line GLi may have a multi-layer structure of an aluminum layer and another metal layer. The common line CLi includes the same material as the gate line GLi and has the same layer structure as the gate line GLi.

A third insulating layer 30 is disposed on the second insulating layer 20 and covers the gate line GLi and the common line CLi. For example, the third insulating layer 30 is disposed directly over the gate line GLi and the common line CLi. In one embodiment, the third insulating layer 30 includes an organic material. In another embodiment, the third insulating layer 30 includes an inorganic material. The third insulating layer 30 may have a multi-layer structure.

A semiconductor layer AL is disposed on the third insulating layer 30 to overlap with the gate electrode GE. An ohmic contact layer (not shown) may be further disposed on the third insulating layer 30. The data line DLj is disposed on the third insulating layer 30.

The data line DLj may include copper (Cu), aluminum (Al), or alloys thereof. The data line DLj may have a multi-layer structure of an aluminum layer and another metal layer, e.g., chromium or molybdenum. A source electrode SE of the thin film transistor TFT is branched from the data line DLj. For example, the source electrode SE may be electrically connected to the data line DLj. The source electrode SE includes the same material as the data line DLj and has the same layer structure as the data line DLj.

A drain electrode DE is disposed on the third insulating layer 30 and spaced apart from the source electrode SE. The source electrode SE and the drain electrode DE overlap with the semiconductor layer AL.

A fourth insulating layer 40 is disposed on the third insulating layer 30 and covers the source electrode SE, the drain electrode DE, and the data line DLj. For example, the fourth insulating layer 40 is disposed directly over the source electrode SE, the drain electrode DE, and the data line DLj. The fourth insulating layer 40 provides a flat surface. The common electrode CE is disposed on the fourth insulating layer 40. The common electrode CE is connected to the common line CLi through a first contact hole CH1 formed through the third and fourth insulating layers 30 and 40. In one example embodiment, the common electrode CE may be disposed on the second base substrate SUB2 depending on the operation mode of the pixel PXij.

A fifth insulating layer 50 is disposed on the fourth insulating layer 40 and covers the common electrode CE. For example, the fifth insulating layer 50 is disposed directly over the common electrode CE. The pixel electrode PE is disposed on the fifth insulating layer 50 and overlaps with the common electrode CE. The pixel electrode PE is connected to the drain electrode DE through a second contact hole CH2 formed through the fourth and fifth insulating layers 40 and 50. A protective layer that protects the pixel electrode PE and an alignment layer may be further disposed on the fifth insulating layer 50.

The pixel electrode PE includes a plurality of slits SLT. In the example of FIG. 3, the pixel PE includes a first horizontal portion P1, a second horizontal portion P2 spaced apart from the first horizontal portion P1, and a plurality of vertical portions P3 that connects the first horizontal portion P1 and the second horizontal portion P2. The slits SLT are disposed between the vertical portions P3. However, the shape of the pixel electrode PE should not be limited thereto or thereby. For example, in another embodiment, the slits SLT may be formed in the common electrode CE instead of the pixel electrode PE.

The thin film transistor TFT outputs the data voltage applied to the data line DLj in response to the gate signal applied to the gate line GLi. The common electrode CE receives a common voltage and the pixel electrode PE receives a pixel voltage corresponding to the data voltage. The common electrode CE and the pixel electrode PE form a horizontal electric field. The horizontal electric field may cause the arrangement of directors in the liquid crystal layer LL to be changed.

The second base substrate SUB2 may be a transparent substrate, e.g., a glass substrate, a plastic substrate, a silicon substrate, etc. In the example of FIG. 4, the color filter CF and the black matrix BM are disposed on the second base substrate SUB2.

The color filter CF is overlaps at least the transmitting area TA. The color filter CF covers the transmitting area TA when viewed in a plan view and partially overlaps the light blocking area LSA. The color filter CF may include a red, green, or blue color. In FIG. 4, one color filter CF corresponding to the pixel PXij has been shown, but the liquid crystal display panel DP includes a plurality of color filter groups having colors different from each other, wherein each of the pixels PX11 to PXnm belongs to one of the plurality of color filter groups.

The black matrix BM overlaps the light blocking area LSA. The light blocking area LSA may be referred to as an area in which the black matrix BM is disposed, and the transmitting area TA may be referred to as an area in which no black matrix BM is disposed.

The light blocking area LSA has a size determined based on the shape of the black matrix BM. As shown in FIGS. 3 and 4, the thin film transistor TFT may overlap with the light blocking area LSA, but it should not be limited thereto or thereby. For example, the thin film transistor TFT may overlap with the transmitting area TA.

Figure 5:
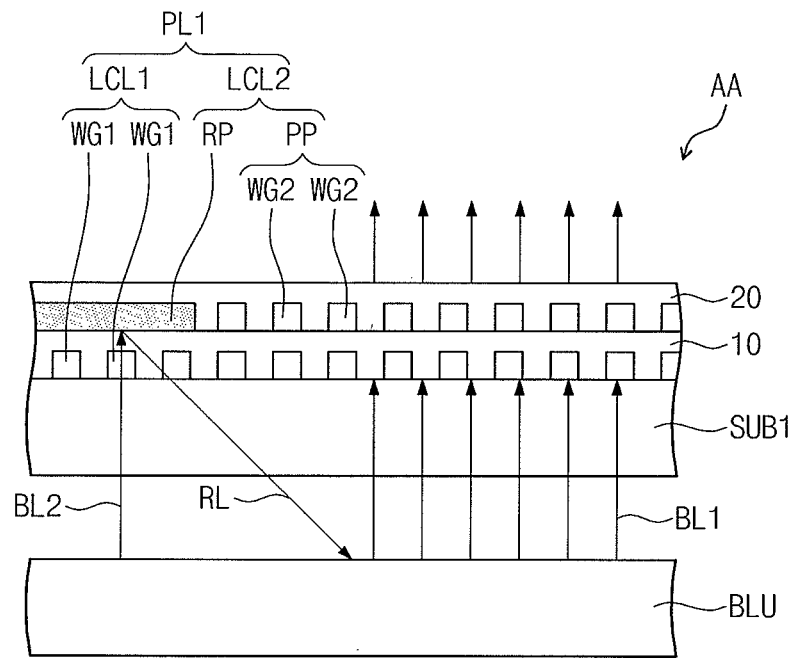
FIG. 5 is an enlarged view showing a portion AA shown in FIG. 4.
Figure 6:
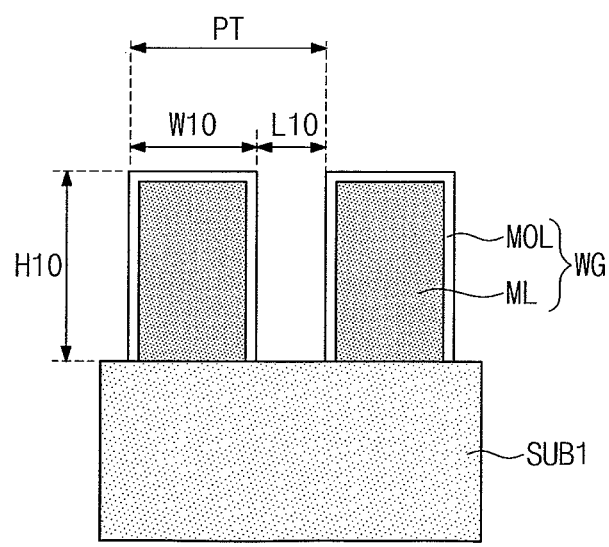
FIG. 6 is an enlarged view showing a lattice pattern shown in FIG. 5.
Figure 7A:
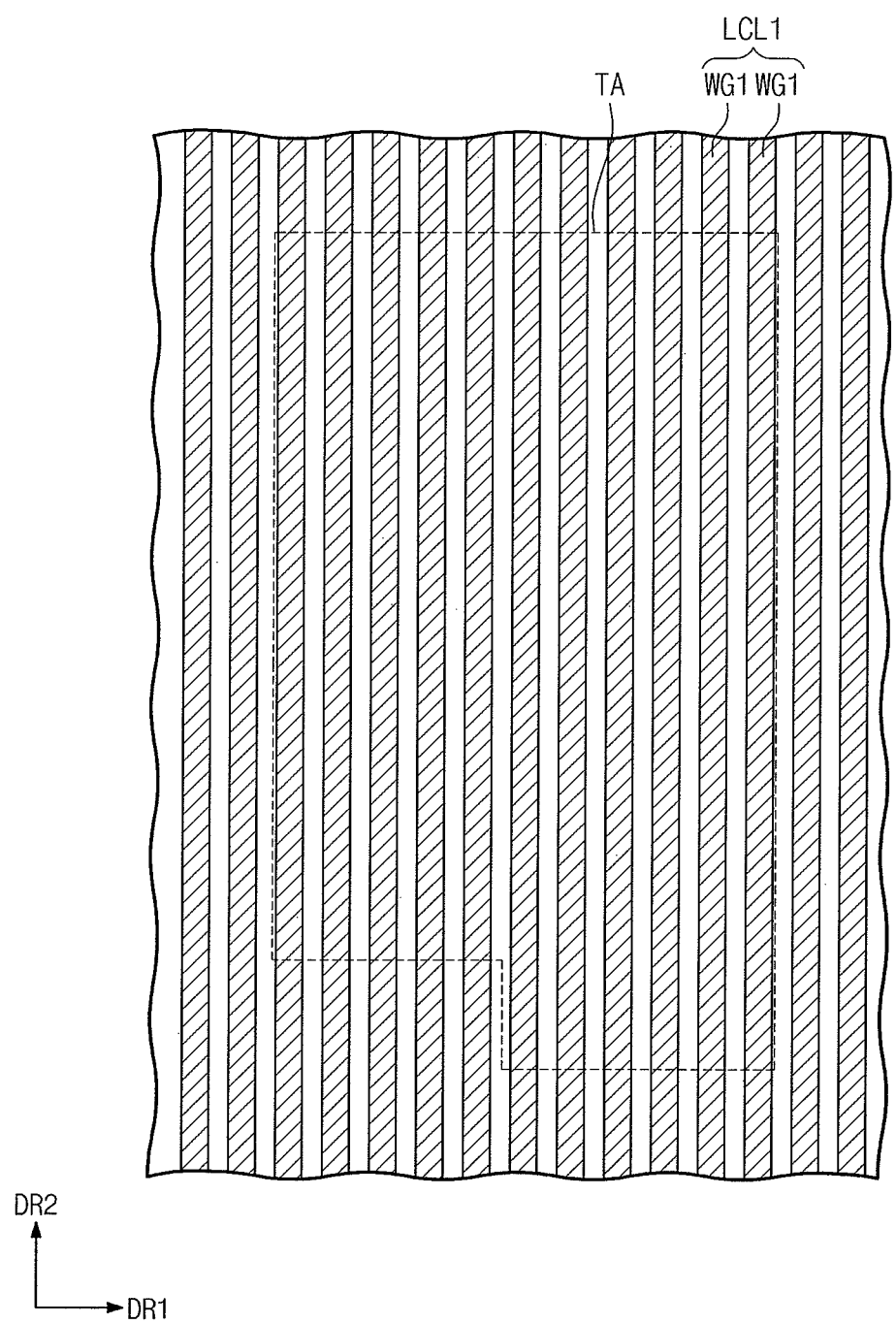
FIGS. 7A and 7B are plan views showing first and second optical conversion layers according to an example embodiment of the present disclosure.
Figure 7B:
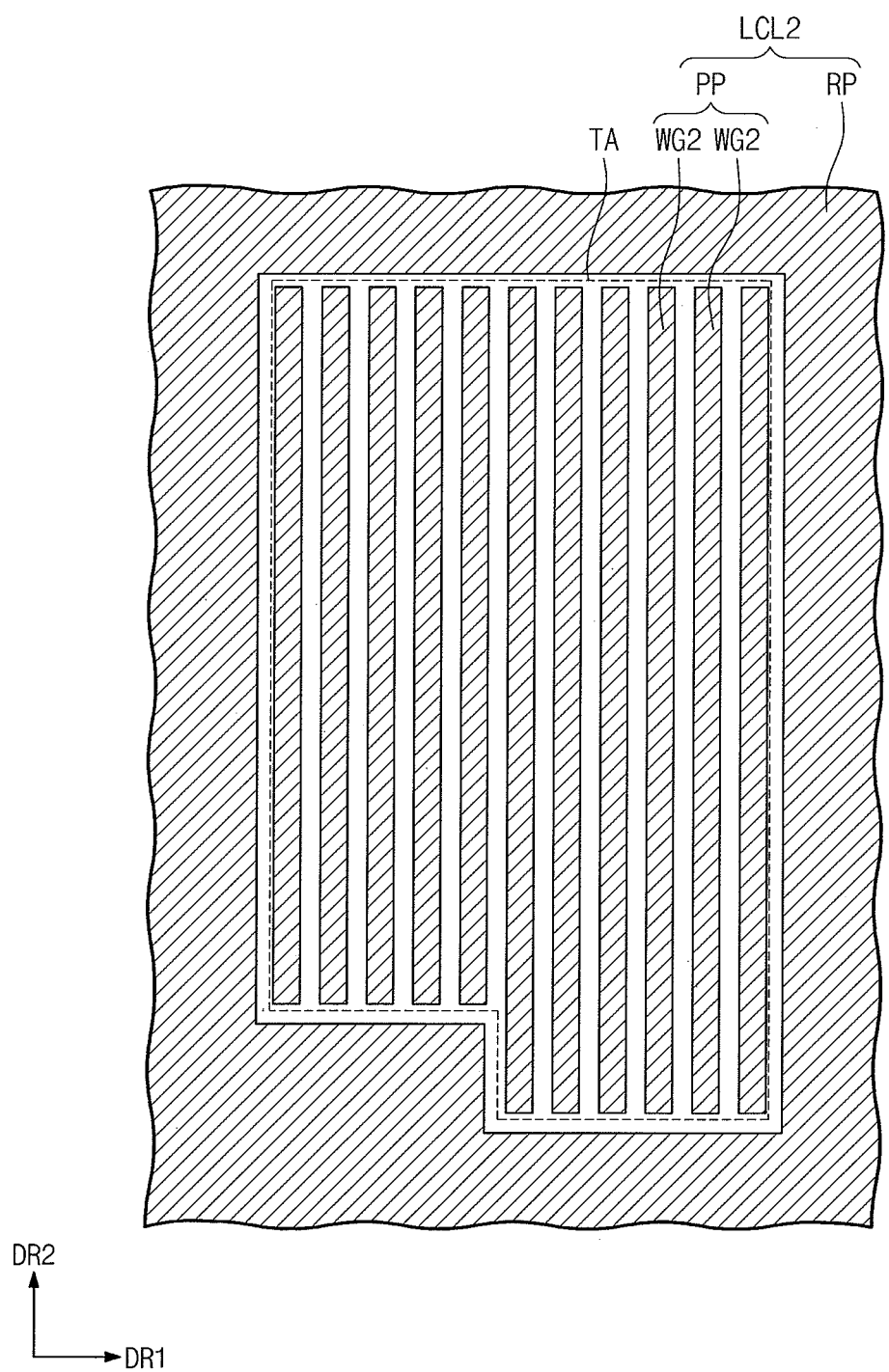
Figure 8:
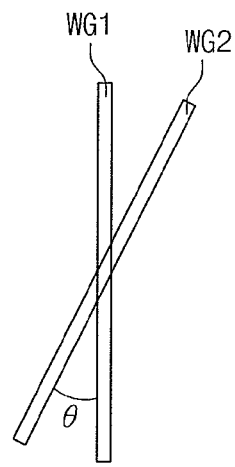
FIG. 8 is a view showing an arrangement of first and second lattice patterns.

FIG. 5 is an enlarged view showing the portion labeled AA in FIG. 4. FIG. 6 is an enlarged view showing the lattice pattern shown in FIG. 5. FIGS. 7A and 7B are plan views showing the first and second optical conversion layers according to an example embodiment of the present disclosure. FIGS. 7A and 7B further show areas in which the first and second optical conversion layers overlap with the pixel PXij, respectively. FIG. 8 is a view showing an arrangement of the first and second lattice patterns.

Turning to FIG. 5, the first polarizer PL1 includes the first optical conversion layer LCL1 and the second optical conversion layer LCL2. The first optical conversion layer LCL1 includes a plurality of lattice patterns WG1 and the second optical conversion layer LCL2 includes a reflection part RP and a polarization part PP. The polarization part PP includes a plurality of second lattice patterns WG2.

FIG. 6 shows two lattice patterns WG disposed on the first base substrate SUB1. The two lattice patterns WG may be a part of the first lattice patterns WG1 or a part of the second lattice patterns WG2.

Each of the lattice patterns WG has a predetermined thickness H10. In one embodiment, each of the lattice patterns WG has the same thickness. In another embodiment, the lattice patterns WG have different thicknesses as compared to one another. In one embodiment, the thickness H10 ranges from about 50 nm to about 150 nm.

Each of the lattice patterns WG has a predetermined width W10. The lattice patterns WG are spaced apart from each other by a predetermined distance L10. The sum of the width W10 and the distance L10 is referred to as a pitch PT. In one embodiment, the pitch PT ranges from about 100 nm to about 150 nm. The ratio of the distance L10 to the pitch PT may range from about 0.3:1 to about 0.6:1.

Each of the lattice patterns WG includes a metal layer ML and a metal oxide layer MOL surrounding the metal layer ML. In one embodiment, the metal layer ML includes aluminum and the metal oxide layer MOL includes aluminum oxide.

The lattice patterns WG are formed by an imprint method, and the metal oxide layer MOL is formed while the lattice patterns WG are formed. The metal oxide layer MOL is formed by oxidizing a surface of the imprinted metal layer ML. The metal oxide layer MOL has a thickness of about a few nanometers. For example, the metal oxide layer may have a thickness of about 1 nm, about 2 nm, about 3 nm, about 4 nm, about 5 nm, about 6 nm, about 7 nm, about 8 nm, or about 9 nm.

FIG. 6 shows the lattice patterns WG each having a rectangular shape in a cross-section view, but they should not be limited to the rectangular shape. For example, in another embodiment, each lattice pattern WG may have a square shape or a trapezoidal shape.

Turning to FIGS. 7A and 7B, the first lattice patterns WG1 extend in the same direction as the second lattice patterns WG2. FIGS. 7A and 7B show the first and second lattice patterns WG1 and WG2 extending in the second direction DR2. The direction in which the first and second lattice patterns WG1 and WG2 extend does not necessarily match the direction in which the data lines DL1 to DLm extend.

As shown in FIG. 7B, the second lattice patterns WG2 are spaced apart from the reflection part RP. The second lattice patterns WG2 are separated from the reflection part RP along a boundary line of the reflection part RP and the light blocking area LSA of the transmitting area TA.

The first lattice patterns WG1 may be substantially parallel to the second lattice patterns WG2. The term of "parallel" used herein means that an included angle θ between the first lattice pattern WG1 and the second lattice pattern WG2 (e.g., the smaller of the two angles) as shown in FIG. 8 is smaller than or equal to about 0.1 degrees.

Turning back to FIG. 5, portions of the first lattice patterns WG1, which correspond to portions of the second lattice patterns WG2, are completely overlapped with the corresponding patterns of the second lattice patterns WG2. For example, the first lattice patterns WG1 that have corresponding second lattice patterns WG2 may completely overlap with the corresponding second lattice patterns WG2, respectively. The corresponding first and second lattice patterns WG1 and WG2 may have the same pitch PT, the same width W10, and the same thickness H10.

In another example embodiment, the first lattice patterns WG1 may have different pitch PT, thickness H10, and width W10 from those of the second lattice patterns WG2. The pitch PT, thickness H10, and width W10 of each of the first lattice patterns WG1 and each of the second lattice patterns WG2 are in the ranges described in FIG. 6.

As shown in FIG. 5, the lights BL1 and BL2 generated by the backlight unit BLU are incident to the first optical conversion layer LCL1. Among the lights BL1 and BL2 generated by the backlight unit BLU, the light vibrating in the second direction DR2 in which the first lattice patterns WG1 extend is reflected and the light vibrating in the first direction DR1 in which the first lattice patterns WG1 are arranged is transmitted.

Among the lights BL1 and BL2 generated by the backlight unit BLU, the light BL1 is polarized by the first optical conversion layer LCL1 and incident to the polarization part PP of the second optical conversion layer LCL2. The light BL2 is polarized by the first optical conversion layer LCL1 and incident to the reflection part RP of the second optical conversion layer LCL2.

The light incident to the polarization part PP is transmitted through the second optical conversion layer LCL2 while maintaining the polarization of the light at the time the light passed through the first optical conversion layer LCL1. When a ratio of the distance L10 of the first lattice patterns WG1 to the pitch PT is the same as a ratio of the distance L10 of the second lattice patterns WG2 to the pitch PT, the polarization of the light may be maintained without the transmittance of the light being reduced.

The light incident to the reflection part RP is reflected to the backlight unit BLU. The light reflected to the backlight unit BLU is reflected again by an optical member (not shown) included in the backlight unit BLU. The re-reflected light may be incident to the polarization part PP. For example, the re-reflected light is incident to the pixel PXij (refer to FIG. 3). Due to the above-mentioned function of the reflection part RP, the light generated by the backlight unit BLU is provided to the pixel PXij without being absorbed by other components. As described above, since the light reflected by the reflection part RP is provided back to the pixel PXij, the light efficiency of the liquid crystal display device is improved.

Figure 9:
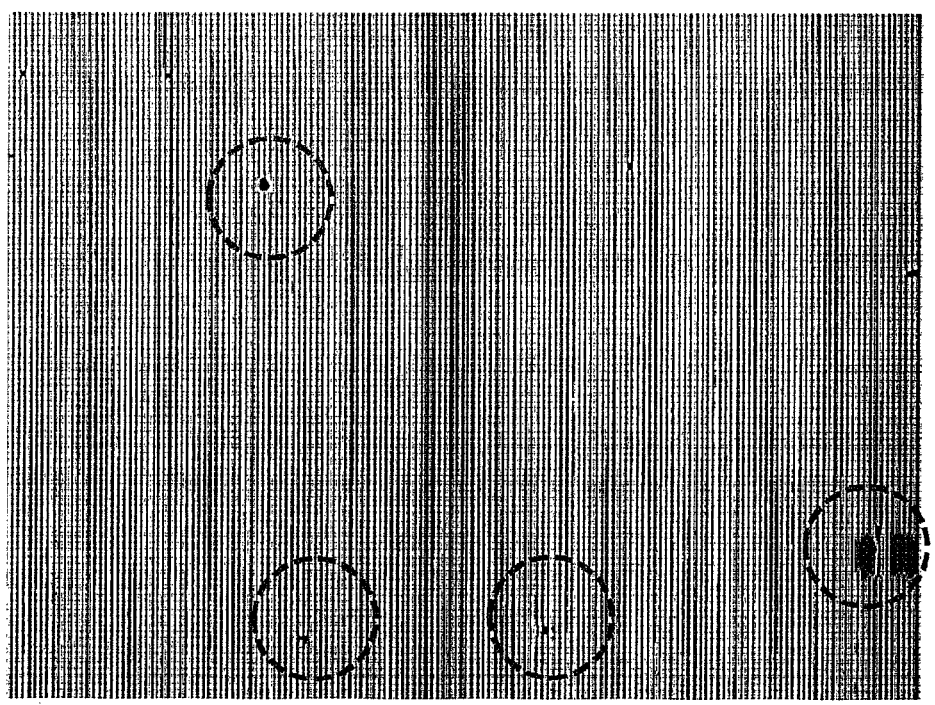
FIG. 9 is a scanning electron microscope (SEM) image showing a damaged optical conversion layer.
Figure 10:
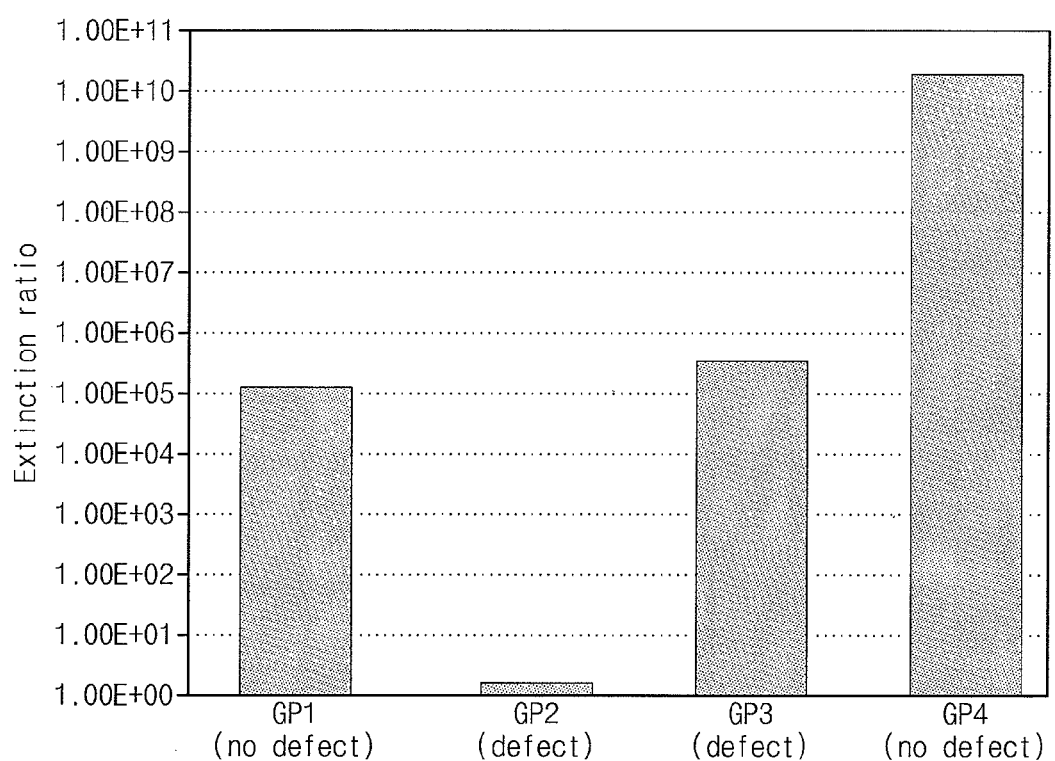
FIG. 10 is a graph showing an extinction ratio according to a structure of the optical conversion layer and a damaged lattice pattern.

FIG. 9 is an SEM image showing a damaged optical conversion layer, and FIG. 10 is a graph showing an extinction ratio according to the structure of the optical conversion layer and a damaged lattice pattern. For example, the extinction ratio may refer to the ratio of the transmission of the unwanted component to the wanted component. In FIG. 10, a first graph GP1 shows the extinction ratio of the polarizer including an optical conversion layer with a single-layer structure, which is not damaged, a second graph GP1 shows the extinction ratio of the polarizer including an optical conversion layer with a single-layer structure, which is damaged, a third graph GP1 shows the extinction ratio of the polarizer including an optical conversion layer that is damaged, and another optical conversion layer that is not damaged, and a fourth graph GP4 shows the extinction ratio of the polarizer including two optical conversion layers that are not damaged.

As shown in FIG. 9, the first lattice patterns WG1 and the second lattice patterns WG2 may be partially damaged during the manufacturing process. The lattice patterns may not be completely printed during the imprinting process and portions of the lattice patterns may be attached to the printing device when the printing device is separated. Accordingly, the portions of the lattice patterns are damaged as represented by the dotted *circulars*.

The polarizer according to the present example embodiment may provide the normally-polarized light to the pixel PXij since the first and second lattice patterns WG1 and WG2 optically compensate for each other even if portions of the first and second lattice patterns WG1 and WG2 are damaged. For instance, although portions of the first lattice patterns WG1 are damaged in the example of FIG. 9, the second lattice patterns WG2, which are not damaged, polarize the light incident to the polarizer.

As represented by the second graph GP2 shown in FIG. 10, when the optical conversion layer having the single-layer structure is damaged, the polarizer has the extinction ratio smaller than a reference value. For example, the reference value is indicated by the extinction ratio of the first graph GP1. In one embodiment, if the polarizer has an extinction ratio smaller than the reference value, the polarizer is considered to be defective or inferior.

As represented by the third graph GP3, although one of the optical conversion layers is damaged, the polarizer has the extinction ratio greater than the reference value since the extinction ratio is compensated by the other optical conversion layer. As represented by the fourth graph GP4, when the two optical conversion layers are not damaged, the polarizer has a relatively high extinction ratio.

Figure 11:
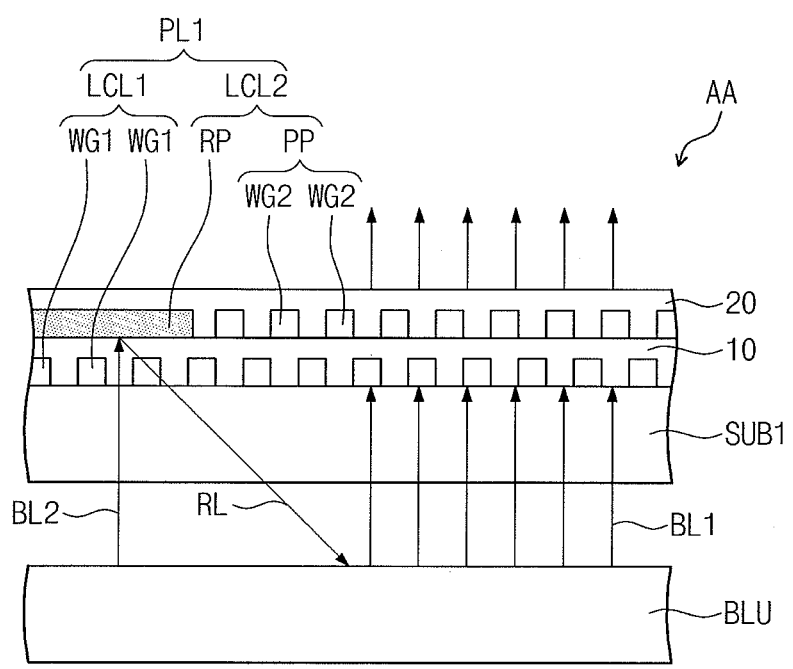
FIG. 11 is a cross-sectional view showing the direction in which a light provided to a first polarizer travels, according to an example embodiment of the present disclosure.
Figure 12:
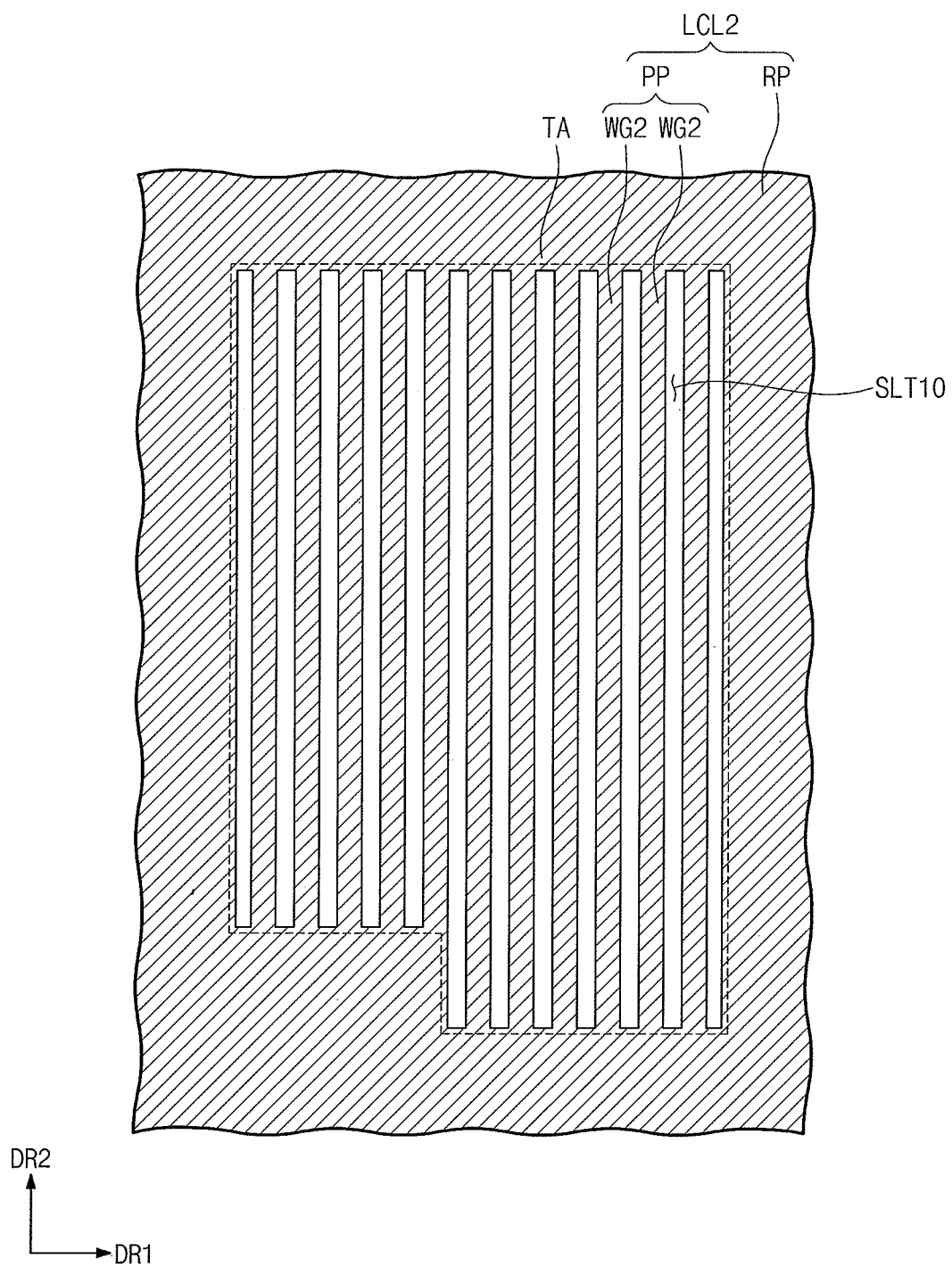
FIG. 12 is a plan view showing a second optical conversion layer according to an example embodiment of the present disclosure.

FIG. 11 is a cross-sectional view showing a direction in which a light travels, which is provided to a first polarizer according to an example embodiment of the present disclosure. FIG. 12 is a plan view showing the second optical conversion layer according to an example embodiment of the present disclosure. FIG. 11 corresponds to FIG. 5, and FIG. 12 corresponds to FIG. 7B. Hereinafter, the liquid crystal display panel will be described in detail with reference to FIGS. 11 and 12. In FIGS. 11 and 12, the same reference numbers denote the same elements in FIGS. 1 to 10, and thus detailed descriptions of the same elements will be omitted.

Turning to FIG. 11, the first polarizer PL1 includes the first optical conversion layer LCL1 and the second optical conversion layer LCL2. The first and second lattice patterns WG1 and WG2 have the same pitch PT, thickness H10, and width W10. The width W10 of the first lattice patterns WG1 may be the same as the distance L10 of the first lattice distances WG1. The width W10 of the second lattice patterns WG2 may be the same as the distance L10 of the second lattice distances WG2. In this case, the first lattice patterns WG1 may have the same width W10 as that of the second lattice patterns WG2.

In the example of FIG. 11, the first lattice patterns WG1 do not overlap with the second lattice patterns WG2. The first lattice patterns WG1 are alternately arranged with respect to the second lattice patterns WG2. Although the first lattice patterns WG1 do not overlap with the second lattice patterns WG2, the light passing through the first polarizer PL1 may have the same polarization as that of the light passing through the first polarizer PL1 shown in FIG. 5.

In another example embodiment, the corresponding patterns between the first lattice patterns WG1 and the second lattice patterns WG2 partially overlap with each other. In this case, the light passing through the first polarizer PL1 may have the same polarization as that of the light passing through the first polarizer PL1 shown in FIG. 5.

Turning to FIG. 12, the second optical conversion layer LCL2 includes the reflection part RP and the polarization part PP, which are connected to each other. Both end portions of the second lattice patterns WG2 are respectively connected to the reflection part RP. The reflection part RP and the polarization part PP are integrally formed as a single unitary and individual unit. The reflection part RP and the polarization part PP, which are integrally formed as a single unitary and individual unit, are formed by patterning the slits SLT10.

FIGS. 13A to 13E are cross-sectional views showing liquid crystal display panels according to example embodiments of the present disclosure. FIGS. 13A to 13E correspond to FIG. 4. In FIGS. 13A to 13E, the same reference numerals denote the same elements in FIG. 10, and thus detailed descriptions of the same elements will be omitted.

Figure 13A:
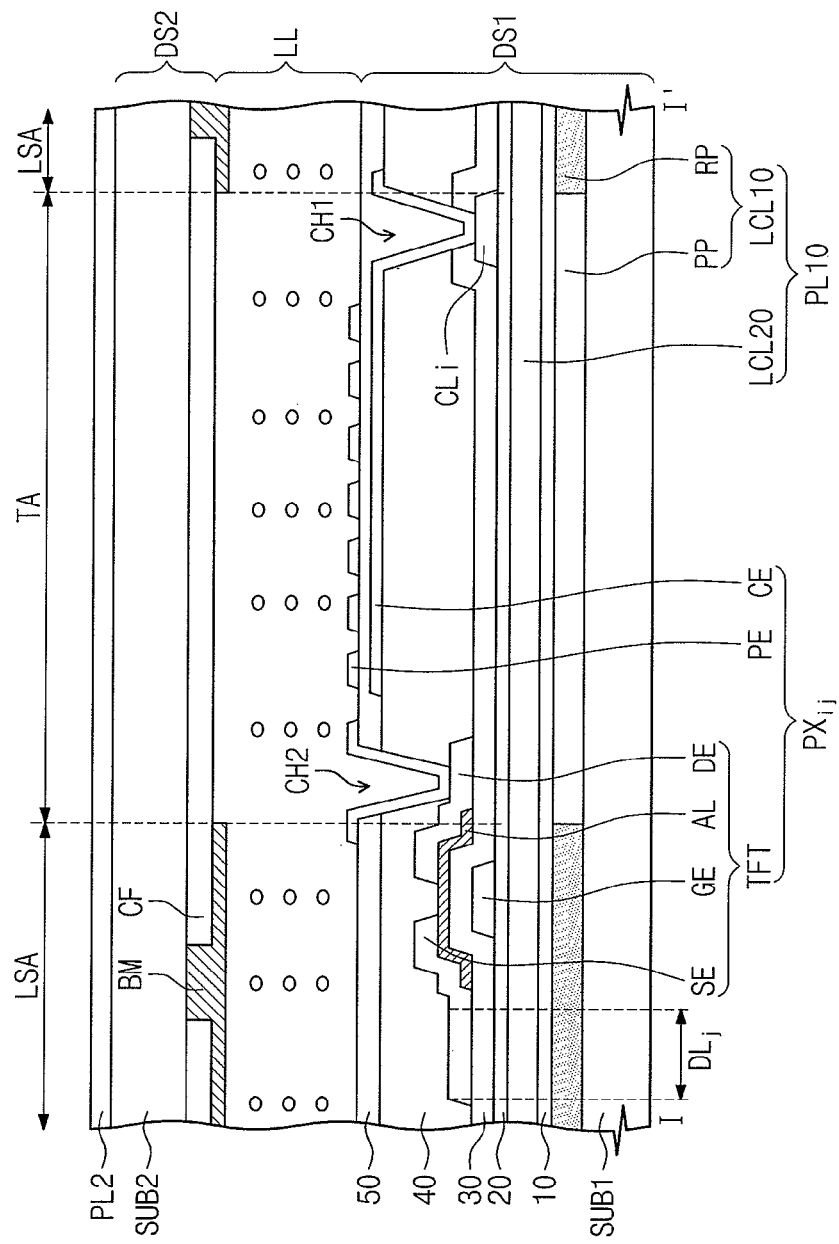
FIGS. 13A to 13E are cross-sectional views showing display panels according to example embodiments of the present disclosure.

Turning to FIG. 13A, a first polarizer PL10 of the liquid crystal display panel includes a first optical conversion layer LCL10 and a second optical conversion layer LCL20. The first optical conversion layer LCL10 and the second optical conversion layer LCL20 are disposed on the surface of the first base substrate SUB1. As shown in FIG. 13A, the first and second optical conversion layers LCL10 and LCL20 may be disposed in different layers.

In the example of FIG. 13, the second optical conversion layer LCL20 is disposed on the first optical conversion layer LCL10. The first optical conversion layer LCL10 includes the reflection part RP and the polarization part PP. The first and second optical conversion layers LCL10 and LCL20 shown in FIG. 13A correspond to the second and first optical conversion layers LCL2 and LCL1, respectively.

The liquid crystal display panel according to the present example embodiment may polarize the light incident to the first polarizer PL10 even though one of the first and second optical conversion layers LCL10 and LCL20 may be damaged. In addition, the reflection part RP of the first optical conversion layer LCL10 reflects the light without absorbing the light. The light reflected by the reflection part RP is incident to the liquid crystal display panel. Therefore, the amount of the light, which is extinct (e.g., absorbed by other elements), is decreased and the amount of the light incident to the liquid crystal display panel is increased, thereby improving the light efficiency.

Figure 13B:
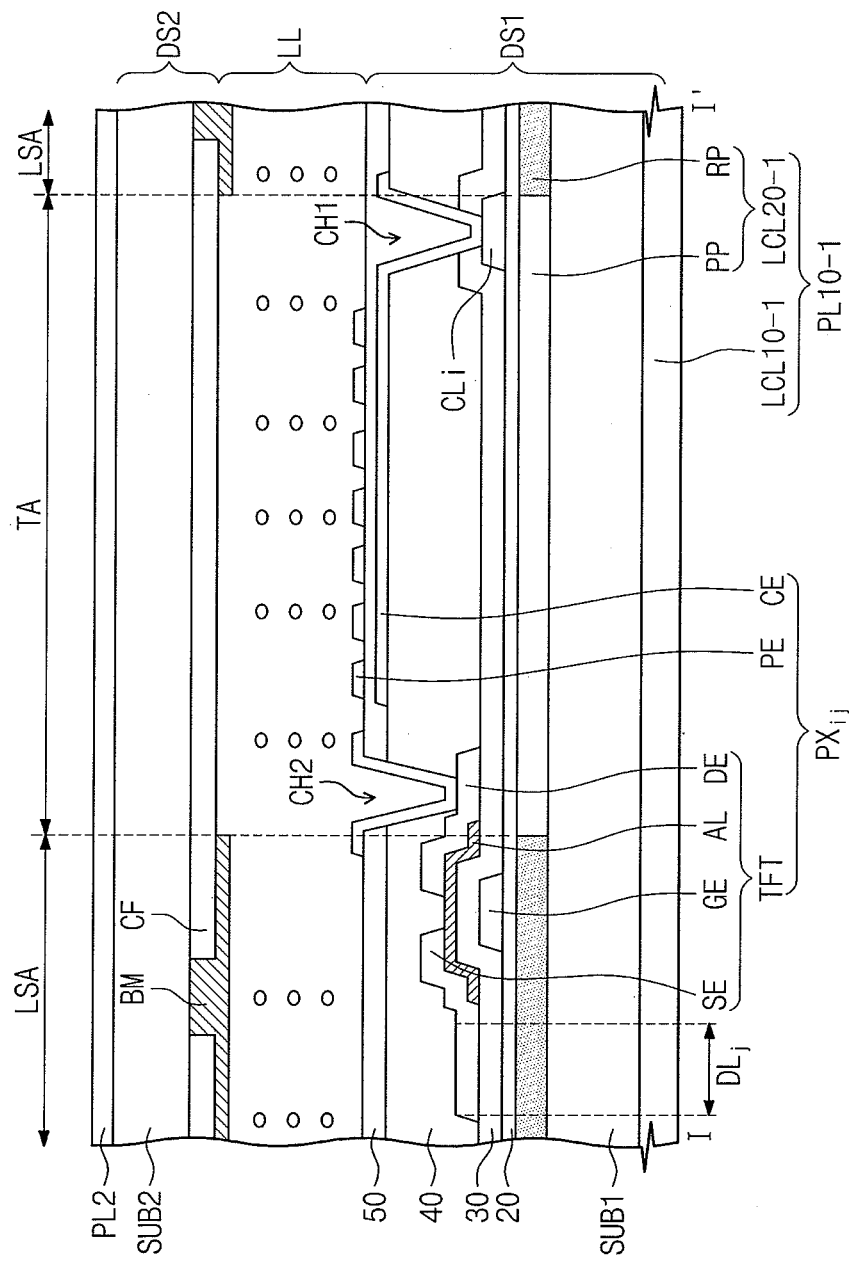

Turning to FIG. 13B, a first polarizer PL10-1 of the liquid crystal display panel includes a first optical conversion layer LCL10-1 and a second optical conversion layer LCL20-1. The first optical conversion layer LCL10-1 and the second optical conversion layer LCL20-1 correspond to the first optical conversion layer LCL1 and the second optical conversion layer LCL2 shown in FIG. 4, respectively.

In the example of FIG. 13B, the first optical conversion layer LCL10-1 is disposed on a lower surface of the first base substrate SUB1 and the second optical conversion layer LCL20-1 is disposed on an upper surface of the first base substrate SUB1. The first base substrate SUB1 has the same function as that of the first insulating layer 10 shown in FIG. 4. The positions of the first optical conversion layer LCL10-1 and the second optical conversion layer LCL20-1 may be changed with respect to each other. Although not shown in figures, an insulating layer or a protective layer may be further disposed on the lower surface of the first base substrate SUB1 to protect the first optical conversion layer LCL10-1.

Figure 13C:
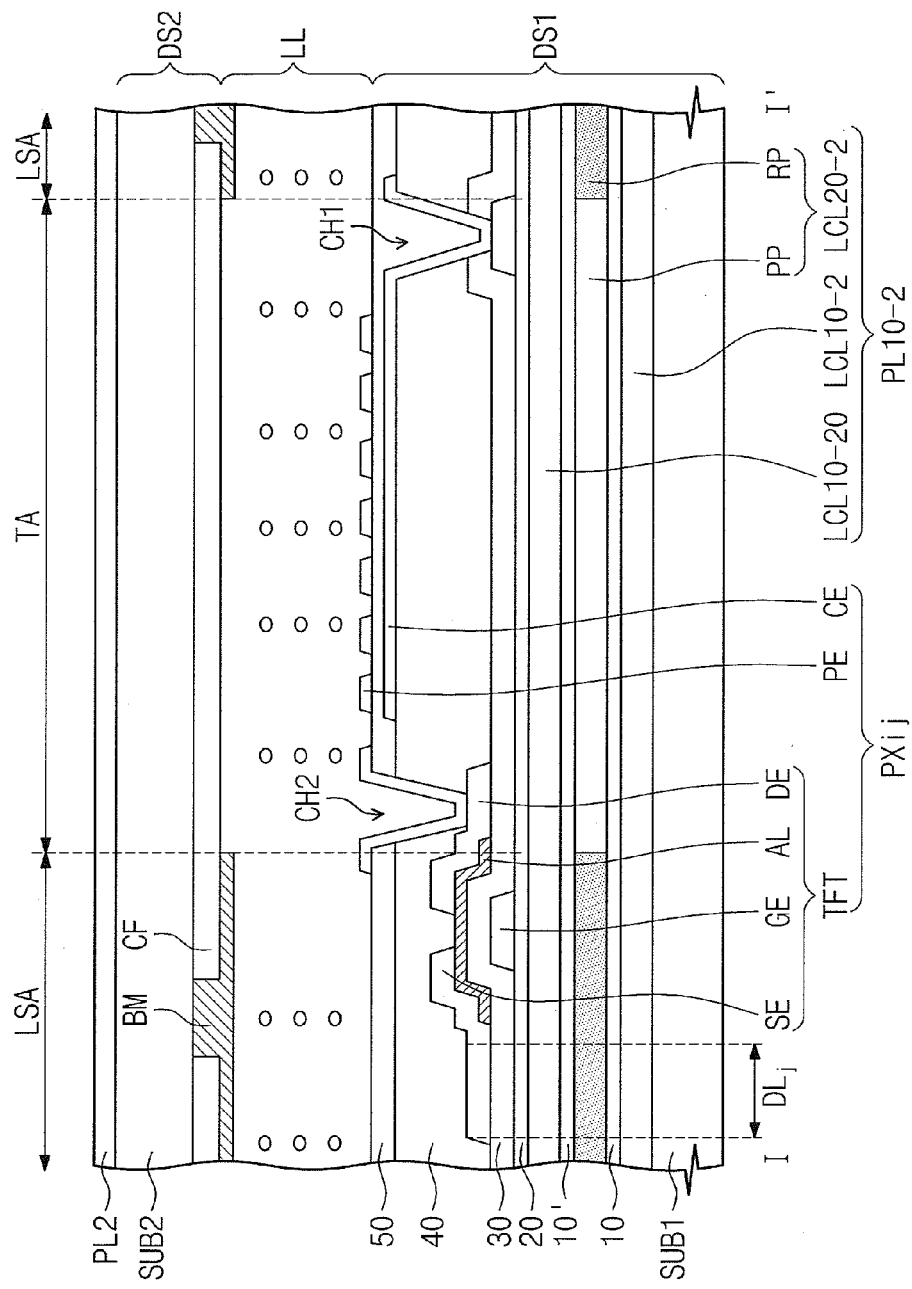

Turning to FIG. 13C, a first polarizer PL10-2 of the liquid crystal display panel includes two first optical conversion layers LCL10-2 and LCL10-20 and one second conversion layer LCL20-2. The two first optical conversion layers LCL10-2 and LCL10-20 shown in FIG. 13C correspond to the first optical conversion layer LCL1 shown in FIG. 13C. The second optical conversion layer LCL20-2 corresponds to the second optical conversion layer LCL2 shown in FIG. 4. As shown in FIG. 13C, the second optical conversion layer LCL20-2 includes the reflection part RP and the polarization part PP.

The first optical conversion layer LCL10-2, the second optical conversion layer LCL20-2, and the first optical conversion layer LCL10-20 (hereinafter, referred to as a third optical conversion layer) are sequentially stacked on the upper surface of the first base substrate SUB1. A first insulating layer 10 disposed between the first optical conversion layer LCL10-2 and the second optical conversion layer LCL20-2 and a first insulating layer 10' disposed between the second optical conversion layer LCL20-2 and the third optical conversion layer LCL10-20 may be made of the same material. The stacking order of the first optical conversion layer LCL10-2, the second optical conversion layer LCL20-2, and the third optical conversion layer LCL10-20 should not be limited to the above-mentioned staking order, and the optical conversion layers may be arranged in any other order.

The first polarizer PL20-2 employing the third optical conversion layer LCL10-20 has improved polarization since other conversion layers polarize the light even when one of the optical conversion layers is damaged.

In another example embodiment, the polarizer may include one first optical conversion layer and two second optical conversion layers. In yet another example embodiment, three optical conversion layers may be the same as the first optical conversion layer LCL1 or the second optical conversion layer LCL2.

Figure 13D:
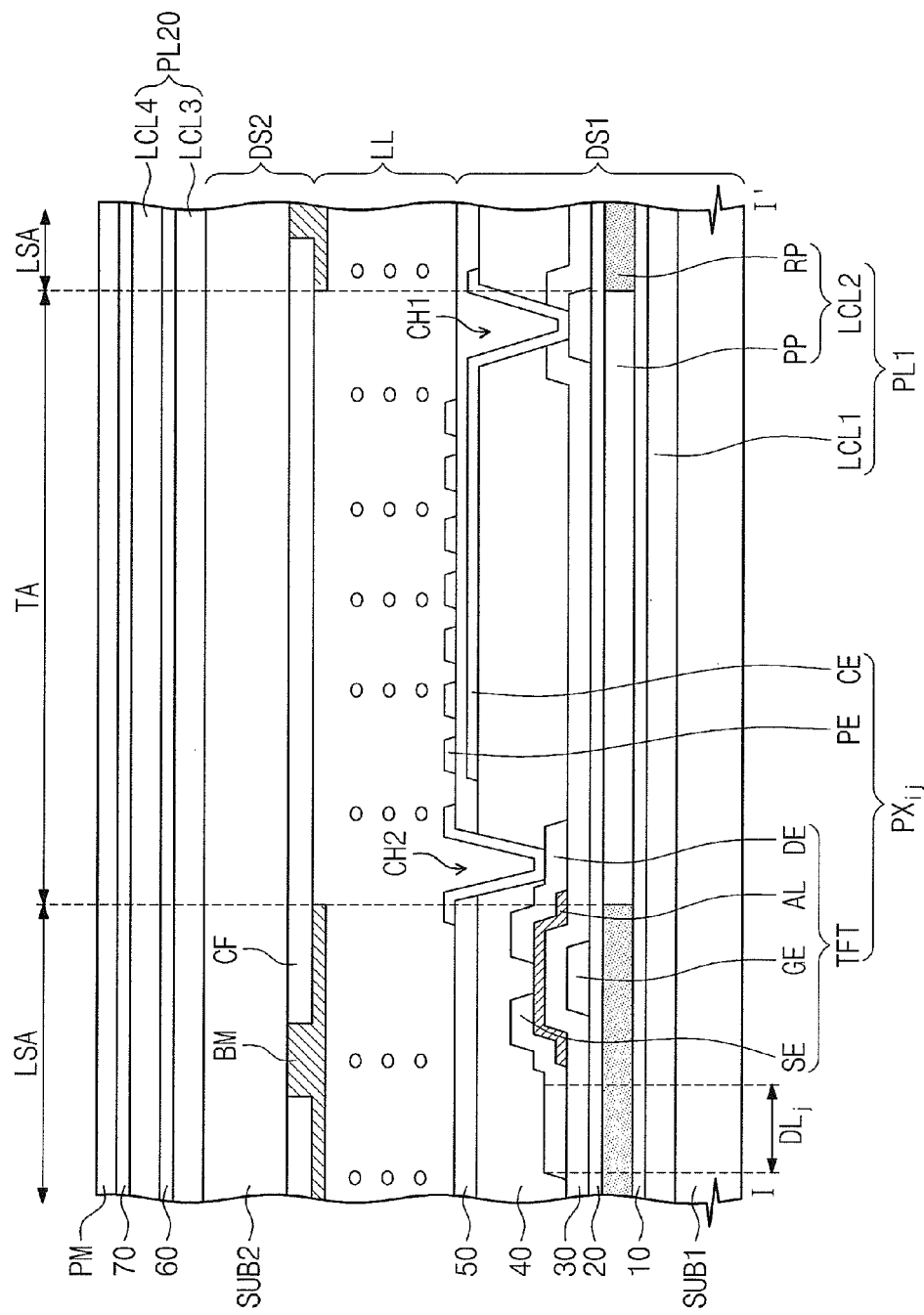

Turning to FIG. 13D, a second polarizer PL20 of the liquid crystal display panel includes a third optical conversion layer LCL3 and a fourth optical conversion layer LCL4. The third optical conversion layer LCL3 and the fourth optical conversion layer LCL4 shown in FIG. 13D correspond to the first optical conversion layer LCL1 shown in FIG. 4. According to the present example embodiment, the second polarizer, which is the stretch-type polarization film, shown in FIG. 4 is replaced with the polarizer including plural optical conversion layers.

The third optical conversion layer LCL3 is disposed on an upper surface of the second base substrate SUB2 and a sixth insulating layer 60 is disposed on the third optical conversion layer LCL3. The sixth insulating layer 60 may be the same as the first insulating layer 10 shown in FIG. 4. The fourth optical conversion layer LCL4 is disposed on the sixth insulating layer 60. A seventh insulating layer 70 is disposed on the fourth optical conversion layer LCL4. The seventh insulating layer 70 may be the same as the second insulating layer 20 shown in FIG. 4. A protective film PM is disposed on the seventh insulating layer 70 to protect the fourth optical conversion layer LCL4.

In another example embodiment, at least one of the third optical conversion layer LCL3 and the fourth optical conversion layer LCL4 is disposed on a lower surface of the second base substrate SUB2. At least one of the third optical conversion layer LCL3 and the fourth optical conversion layer LCL4 may be the same as the second optical conversion layer LCL2 shown in FIG. 4. In addition, the second polarizer PL20 may include three or more optical conversion layers.

Figure 13E:
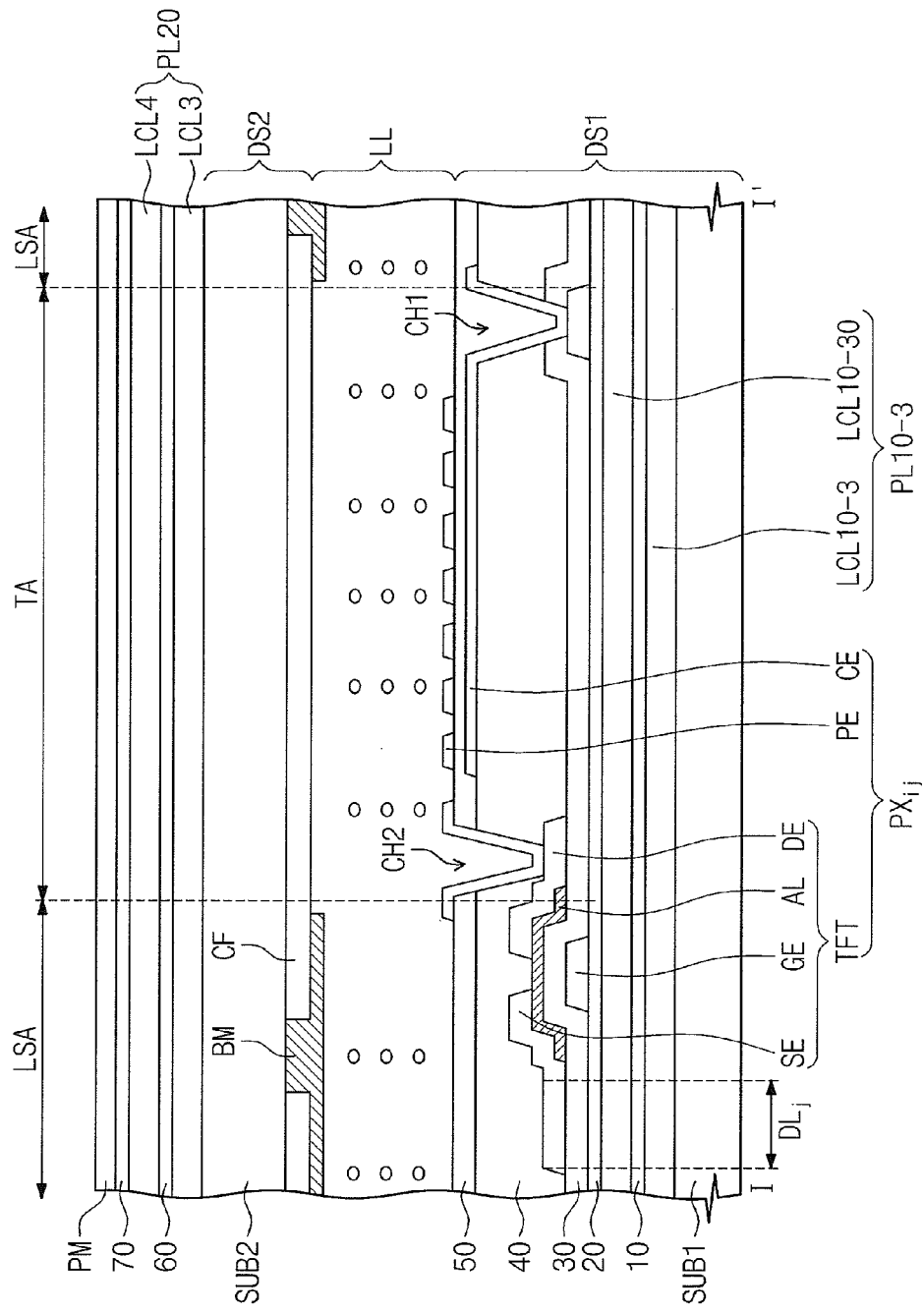

Turning to FIG. 13E, a first polarizer PL10-3 of the liquid crystal display panel includes a first optical conversion layer LCL10-3 and a second optical conversion layer LCL10-30. A second polarizer PL20 includes a third optical conversion layer LCL3 and a fourth optical conversion layer LCL4. Each of the first, second, third, and fourth optical conversion layers LCL10-3, LCL10-30, LCL3, and LCL4 corresponds to the first optical conversion layer LCL1 shown in FIG. 4.

FIGS. 14A to 14I are perspective views showing a manufacturing method of a polarizer according to an example embodiment of the present disclosure. FIGS. 14A to 14I show the manufacturing method of the first polarizer described with reference to FIGS. 4 to 7B.

Figure 14A:
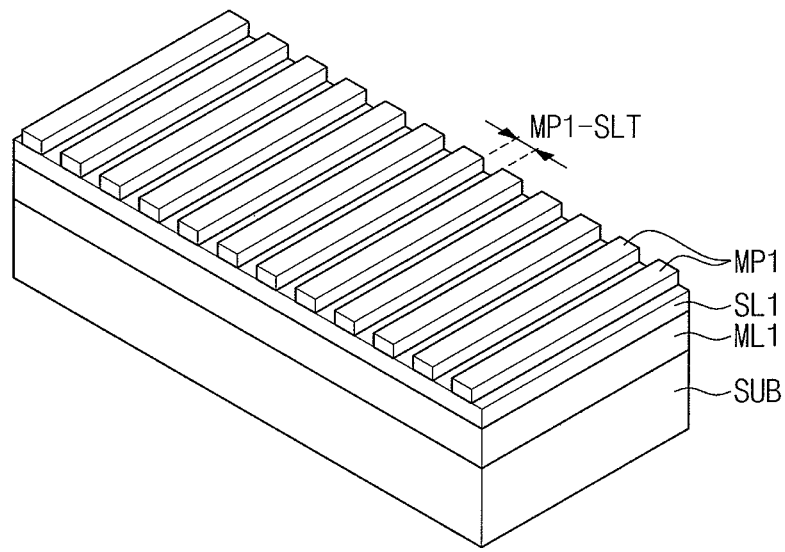
FIGS. 14A to 14I are perspective views showing a manufacturing method of a polarizer according to an example embodiment of the present disclosure.

Turning to FIG. 14A, a first metal layer ML1 is formed on a base substrate SUB. A first sacrificial layer SL1 is formed on the first metal layer ML1. A first mask layer MP1 is disposed on the first sacrificial layer SL1.

The base substrate SUB may be the first base substrate SUB1 (refer to FIG. 4) or a buffer layer disposed on the first base substrate SUB1. The metal layer ML1 is formed by a sputtering method and includes aluminum. The first sacrificial layer SL1 is formed by a depositing method and includes an inorganic material. The first mask layer MP1 includes a mask pattern through which a plurality of slits MP1-SLT is formed. The first mask layer MP is formed by the imprinting method and includes resin.

Figure 14B:
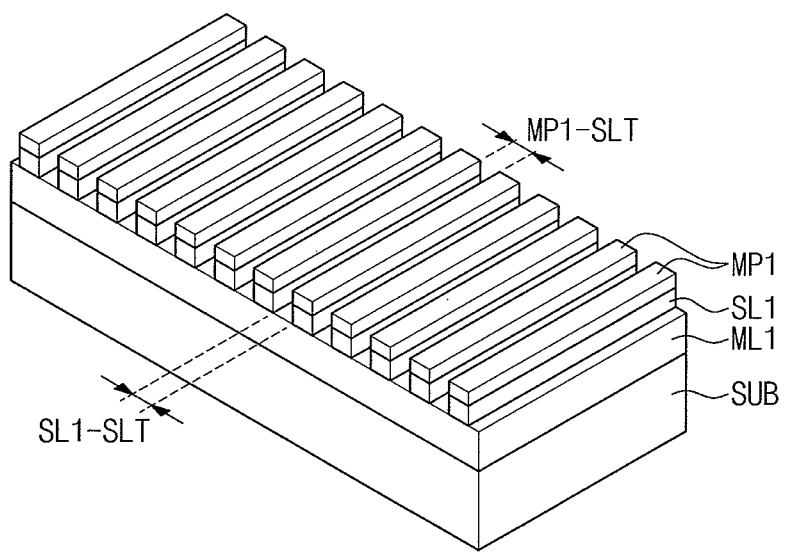

In FIG. 14B, the first sacrificial layer SL1 is patterned. Portions of the first sacrificial layer SL1 exposed through the first mask layer MP1 are removed by using a dry etch process. Accordingly, slits SL1-SLT are formed in the first sacrificial layer SL1.

Figure 14C:
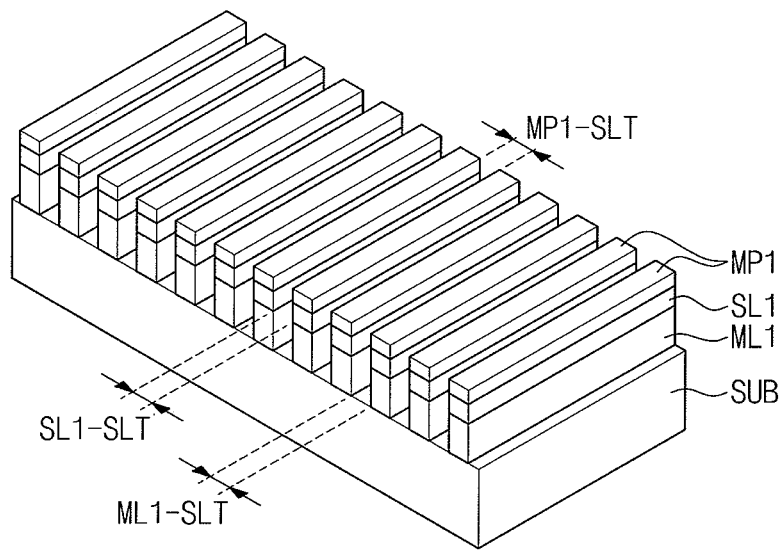

In FIG. 14C, the first metal layer ML1 is patterned. Portions of the first metal layer ML1 exposed through the slits SL1-SLT of the first sacrificial layer SL1 are removed by using a dry etch process. The patterned first metal layer ML1 forms the first lattice patterns WG1 (refer to FIG. 7A).

Figure 14D:
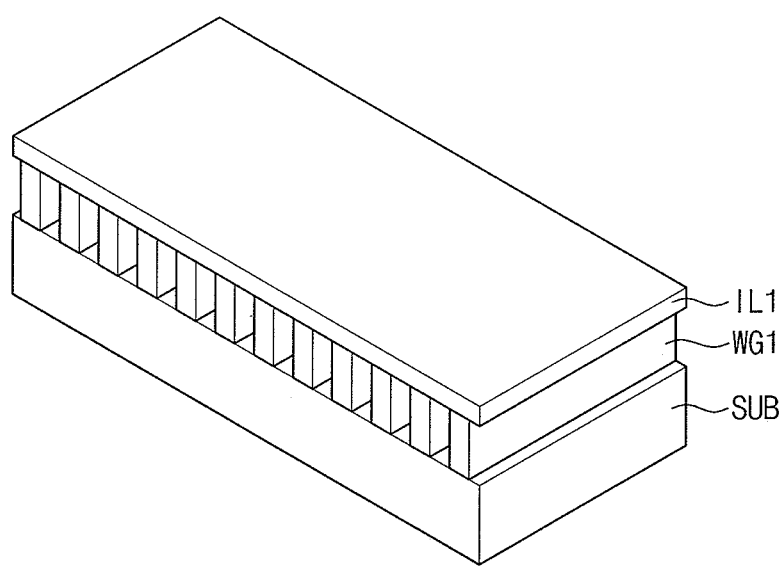

In FIG. 14D, the first sacrificial layer SL1 and the first mask layer ML1 are removed and a first insulating layer IL1 is formed on the first lattice patterns WG1. The first insulating layer IL1 corresponds to the first insulating layer 10 shown in FIG. 4. The first insulating layer IL1 provides a flat surface on the first lattice patterns WG1. The first insulating layer IL1 may be filled in the slits SL1-SLT between the first lattice patterns WG1.

Figure 14E:
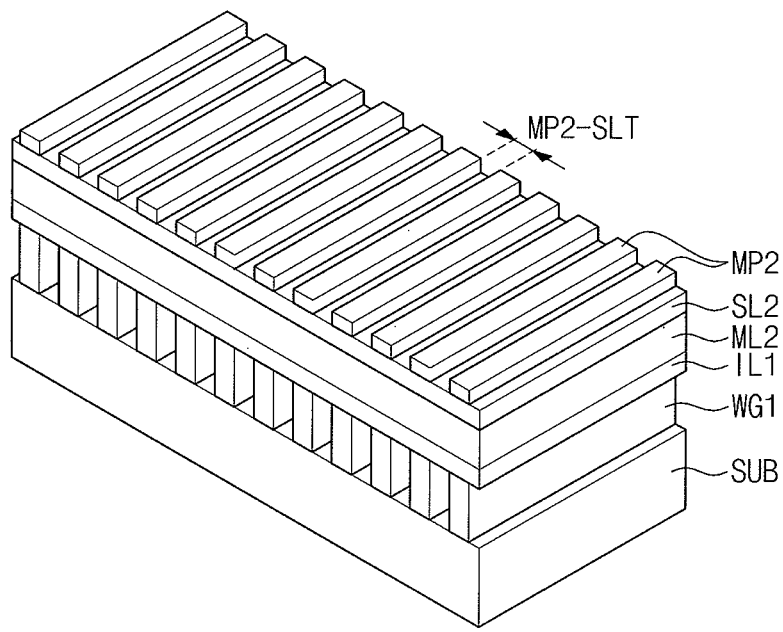

In FIG. 14E, a second metal layer ML2, a second sacrificial layer SL2, and a second mask layer MP2 are formed on the first insulating layer IL1. The second mask layer MP2 includes a mask pattern in which a plurality of slits MP2-SLT are defined.

Figure 14F:
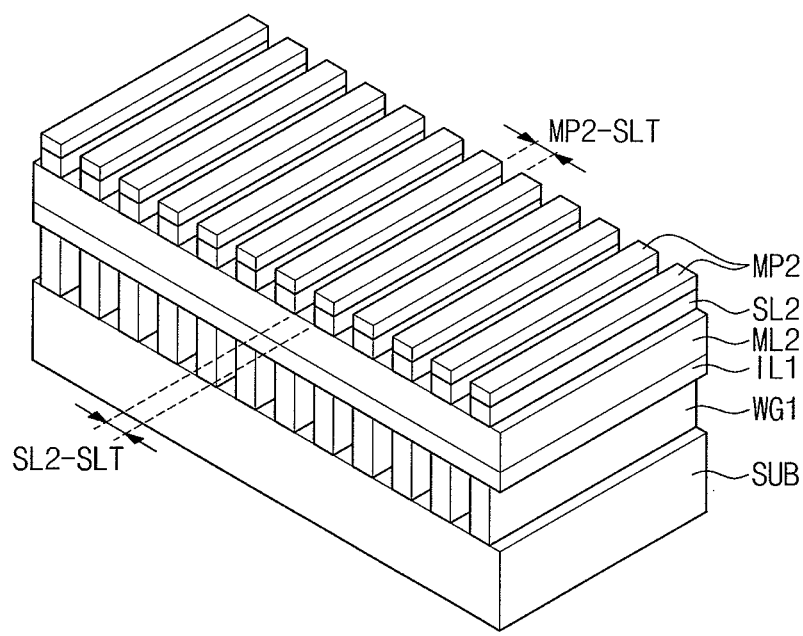

In FIG. 14F, the second sacrificial layer SL2 is patterned. Slits SL2-SLT are formed in the second sacrificial layer SL2 in the same way as described in FIG. 14B.

Figure 14G:
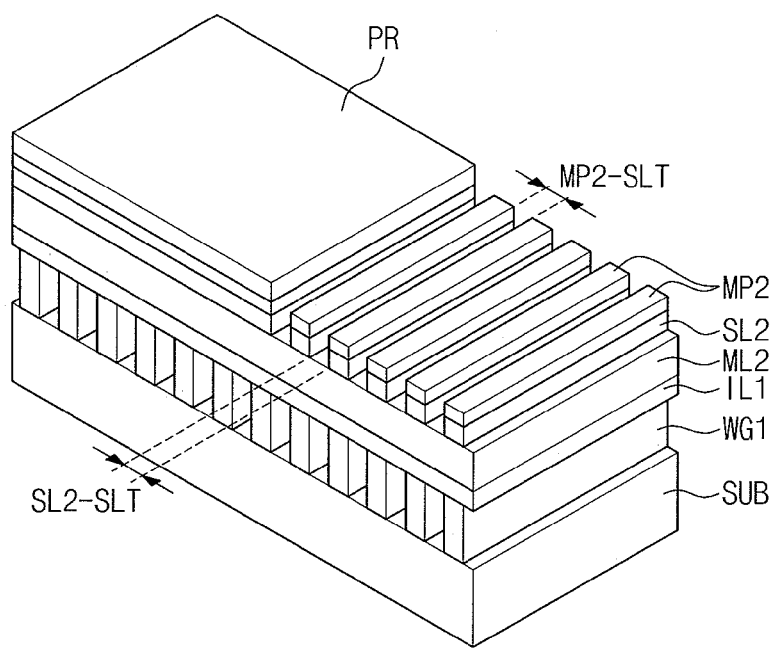

In FIG. 14G, a protective layer PR is formed on the second mask layer MP2 to partially cover the second mask layer MP2. The protective layer PR protects portions of the second metal layer ML2 from being etched in the following processes. The protective layer PR overlaps the area in which the reflection part RP shown in FIG. 7 is disposed.

Figure 14H:
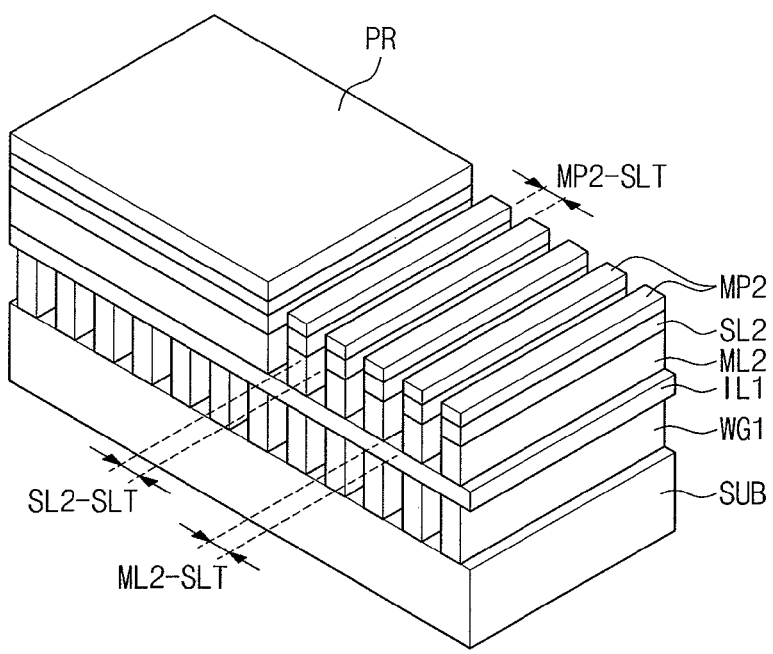

In FIG. 14H, the second metal layer ML2 exposed through the protective layer PR is patterned. Portions of the second metal layer ML2 exposed through the slits SL2-SLT of the second sacrificial layer SL2 are removed by using a dry etch process. The patterned second metal layer ML2 forms the second lattice patterns WG2 (refer to FIG. 7B) and the reflection part RP (refer to FIG. 7B).

Figure 14I:
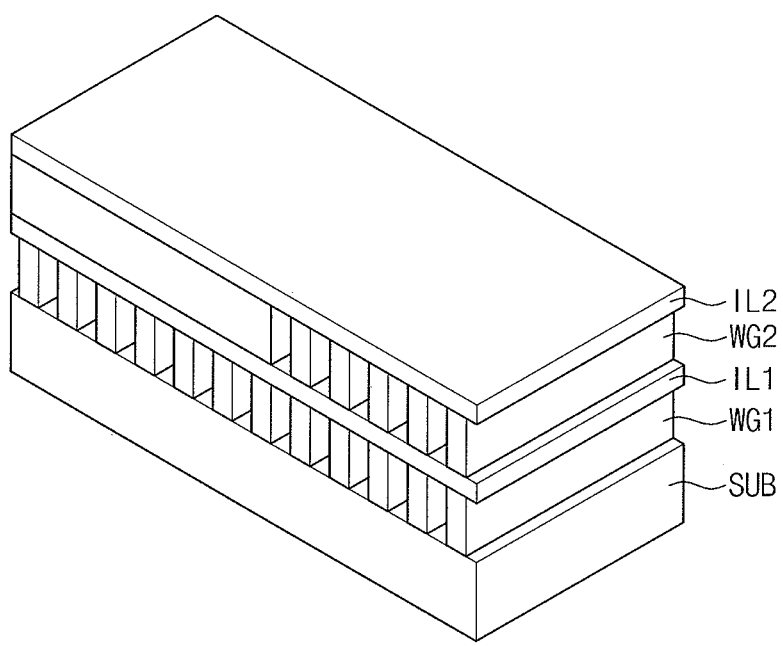

In FIG. 14I, a second insulating layer IL2 is formed on the patterned second metal layer ML2. The second insulating layer IL2 corresponds to the second insulating layer 20 shown in FIG. 4. Then, the thin film transistor TFT, the common electrode CE, and the pixel electrode PE are formed.

In another example embodiment, when the processes described with reference to FIGS. 14A to 14D are performed on the second insulating layer IL2 again, an additional polarizer may be formed. In another example embodiment, when the processes described with reference to FIGS. 14A to 14D and the processes described with reference to FIGS. 14E to 14I are changed with respect to each other, the layer structure of the polarizer may be changed.

Although the example embodiments of the present invention have been described, it is understood that the present invention should not be limited to these example embodiments but various changes and modifications can be made by one ordinary skilled in the art within the spirit and scope of the present invention as hereinafter claimed.

What is claimed is:

1. A display device comprising:
   a first base substrate comprising a plurality of light transmitting areas defined by a light blocking material and a light blocking area such that each of the light transmitting areas is surrounded by the light blocking area defines a first shape of a first area;
   a second base substrate disposed to be spaced apart from the first base substrate;
   a plurality of pixels disposed between the first base substrate and the second substrate, wherein a first one of the plurality of pixels is aligned with a first one of the plurality of light transmitting areas such that the first pixel and the first light transmitting area are overlapping each other when viewed in a direction perpendicular to a major surface of the first base substrate; and
   first and second polarizers spaced apart from each other such that the pixels are disposed therebetween, wherein the first polarizer comprises a plurality of optical conversion layers comprising a first optical conversion layer and a second optical conversion layer wherein the optical conversion layers are vertically displaced from each other,
   wherein the first optical conversion layer includes a first set of wires arranged in parallel with each other, and the second optical conversion layer includes a second set of wires arranged in parallel with each other, and
   wherein the first set of wires have a different thickness from that of the second set of wires such that the wires of different thicknesses are vertically displaced from each other and overlap each other.

2. The display device of claim 1, wherein the second set of wires are parallel to the first set of wires.

3. The display device of claim 1, wherein the first optical conversion layer and the second optical conversion layer are disposed over the first base substrate.

4. The display device of claim 1, wherein the first optical conversion layer and the second optical conversion layer are disposed such that the first base substrate is disposed between the first and second optical conversion layers.

5. The display device of claim 3, wherein the first optical conversion layer and the second optical conversion layer are disposed on the same side of the first base substrate.

6. The display device of claim 5, wherein the first optical conversion layer and the second optical conversion layer are disposed between a surface of the first base substrate and the pixels.

7. The display device of claim 1, further comprising a reflective portion and wherein the first set of wires, the second set of wires and the reflective portion comprise the same material.

8. The display device of claim 1, wherein each of the pixels comprises:
   a thin film transistor connected to a corresponding gate line of gate lines disposed over the first base substrate and a corresponding data line of data lines disposed over the first base substrate; and
   a pixel electrode connected to the thin film transistor.

9. The display device of claim 8, wherein at least one of the polarizers overlaps the pixel electrode and the reflective portion overlaps the thin film transistor when viewed in the direction perpendicular to the major surface of the first base substrate.

10. The display device of claim 1, wherein each of the first and second sets of wires has a thickness of 50 nm to 150 nm.

11. The display device of claim 1, wherein, when a sum of a distance between two adjacent in the second set of wires in a second direction in which the second set of wires are arranged and a width of one wire of the two adjacent wires in the second direction is defined as a pitch, the ratio of the width of the one wire to the pitch in the second direction is in a range from 0.3:1 to 0.6:1.

12. The display apparatus of claim 11, wherein the second set of wires have the same pitch as the first set of wires and the second set of wires have the same width as the first set of wires.

13. The display device of claim 1, wherein the plurality of optical conversion layers further comprise a third optical conversion layer including a third set of wires arranged in parallel with each other, and
   wherein the third set of wires extend in the same direction as the first set of wires and being arranged in the same direction as the first set of wires.

14. The display device of claim 1, wherein the second polarizer is a stretch-type polarization film.

15. The display device of claim 1, wherein the second polarizer comprises:

a third optical conversion layer that includes a third set of wires arranged in parallel with each other; and a fourth optical conversion layer that includes a fourth set of wires arranged in parallel with each other, and wherein the fourth set of wires extend in the same direction as the third set of wires and being arranged in the same direction as the third set of wires, and the third and fourth optical conversion layers being disposed over the second base substrate.

16. The display device of claim 1, further comprising:
a black matrix overlapping the light blocking area when viewed in the direction perpendicular to the major surface of the first base substrate; and
a plurality of color filters overlapping the light transmitting areas when viewed in the direction perpendicular to the major surface of the first base substrate.

17. A display device comprising:
a first base substrate comprising a plurality of light transmitting areas and a light blocking area such that each of the light transmitting areas is surrounded by the light blocking area;
a second base substrate disposed to be spaced apart from the first base substrate;
a plurality of pixels disposed between the first base substrate and the second substrate, wherein a first one of the plurality of pixels is aligned with a first one of the plurality of light transmitting areas such that the first pixel and the first light transmitting area are overlapping each other when viewed in a direction perpendicular to a major surface of the first base substrate; and first and second polarizers spaced apart from each other such that the pixels are disposed therebetween, wherein the first polarizer comprises a first optical conversion layer including a plurality of first wires arranged in parallel with each other and a second optical conversion layer including a plurality of second wires arranged in parallel with each other, wherein the second wires extend in the same direction as the plurality of first wires and are arranged in the same direction as the plurality of first wires, and the second optical conversion layer overlaps with the first optical conversion layer, wherein the first set of wires have a different thickness from that of the second set of wires wherein the optical conversion layers are vertically displaced from each other such that the wires of different thicknesses are vertically displaced from each other and overlap each other.

18. The display device of claim 1, wherein the first set of wires are distributed throughout the first optical conversion layer such that the first optical conversion layer functions as a polarizer in its entirety, whereas the second optical conversion layer comprises a reflective portion corresponding to the light blocking area of the first base substrate and polarizing portions including the second set of wires such that (i) the reflective portion surrounds the polarizing portions when viewed in the direction and (ii) the first light transmitting area overlaps one of the polarizing portions when viewed in the direction.

19. The display device of claim 18, wherein the light blocking area defines a first shape of a first area, and the reflective portion has the same first shape and area as the light blocking area.

20. The display device of claim 1, wherein each of the first and second sets of wires comprises a metal layer and a metal oxide layer covering the metal layer.

* * * * *